United States Patent [19]
Melo et al.

[11] Patent Number: 5,923,859
[45] Date of Patent: Jul. 13, 1999

[54] DUAL ARBITERS FOR ARBITRATING ACCESS TO A FIRST AND SECOND BUS IN A COMPUTER SYSTEM HAVING BUS MASTERS ON EACH BUS

[75] Inventors: Maria L. Melo; Robert Allan Lester, both of Houston, Tex.

[73] Assignee: Compaq Computer Corporation, Houston, Tex.

[21] Appl. No.: 08/974,149

[22] Filed: Nov. 19, 1997

Related U.S. Application Data

[63] Continuation of application No. 08/421,202, Apr. 13, 1995, abandoned.

[51] Int. Cl.$^6$ .................................................. G06F 13/00
[52] U.S. Cl. ........................ 395/293; 395/294; 395/299; 395/728; 395/726
[58] Field of Search .................................... 395/293, 294, 395/299, 726, 728

[56] References Cited

U.S. PATENT DOCUMENTS

| | | |
|---|---|---|
| 4,755,938 | 7/1988 | Takahashi et al. . |
| 4,980,854 | 12/1990 | Donaldson et al. . |
| 4,987,529 | 1/1991 | Craft et al. ............................... 364/200 |
| 5,067,071 | 11/1991 | Schanin et al. . |
| 5,083,260 | 1/1992 | Tsuchiya .................................. 395/325 |
| 5,151,994 | 9/1992 | Wille et al. . |
| 5,191,656 | 3/1993 | Forde, III et al. . |
| 5,212,796 | 5/1993 | Allison .................................... 395/725 |
| 5,301,282 | 4/1994 | Amini et al. ............................. 395/325 |
| 5,317,696 | 5/1994 | Hilgendorf . |
| 5,333,274 | 7/1994 | Amini et al. ............................. 395/275 |
| 5,392,436 | 2/1995 | Jansen et al. ............................ 395/725 |
| 5,438,666 | 8/1995 | Craft et al. ............................... 395/842 |
| 5,448,742 | 9/1995 | Bhattacharya .......................... 395/481 |
| 5,524,235 | 6/1996 | Larson et al. ............................ 395/478 |
| 5,528,766 | 6/1996 | Ziegler et al. ........................... 395/293 |
| 5,535,395 | 7/1996 | Tipley et al. ............................. 395/729 |
| 5,596,729 | 1/1997 | Lester et al. ............................. 395/308 |

FOREIGN PATENT DOCUMENTS

0374521A2   6/1990   European Pat. Off. .

OTHER PUBLICATIONS

82375EB PCI–EISA Bridge (PCEB) Order Number: 290477–001, Apr. 1993.

82420/82430 PCI SET, ISA and EISA Bridges, Intel Corp., pp. 3–5, 17, 35, 37, 148, 154–157, 172–174, 211, 225–226, 293–302, 320–321, 345, 363–364, 438–444, 460–462 (1993).

Peripheral Components, Intel Corp., pp. 1–215, 1–222 to 1–225, 1–245 to 1–246, 1–265 to 1–267, 1–280 to 1–285 (1993).

*Primary Examiner*—Ayaz R. Sheikh
*Assistant Examiner*—Eric S. Thlang
*Attorney, Agent, or Firm*—Akin, Gump, Strauss, Hauer & Feld, L.L.P.

[57] ABSTRACT

Arbitration circuitry in a computer system having a plurality of arbiters for arbitrating requests from bus masters on a PCI bus and an EISA bus. Each of the PCI and EISA buses have a plurality of masters. The PCI bus utilizes a modified LRU arbitration scheme, while the EISA bus utilizes a rotating priority scheme. The arbiter on the EISA bus includes a first level of arbitration and a second level of arbitration. The first level is assigned a plurality of requester types to determine the priority between the requestor types. Certain of the first level requestor types include a plurality of devices. If one of those certain requestor types wins priority on the first level arbitration cycle, a second level arbitration is performed to determine the priority between the plurality of devices.

32 Claims, 18 Drawing Sheets

DUAL ARBITERS FOR ARBITRATING ACCESS TO A FIRST AND SECOND BUS IN A COMPUTER SYSTEM HAVING BUS MASTERS ON EACH BUS

This is a continuation of application Ser. No. 08/421,202, filed on Apr. 13, 1995 now abandoned.

BACKGROUND OF THE INVENTION

1. Field of the Invention

The invention relates to bus arbitration protocols, and more particularly, to a protocol including multiple arbiters for arbitrating access to a plurality of buses.

2. Description of the Related Art

The performance demands on personal computers are ever increasing. It has been determined that a major bottleneck in improving performance is the capability to perform input/output (I/O) operations. Processor speeds continue to increase at a great rate and memory speeds and architectures can partially keep pace. However, the speed of I/O operations, such as disk and local area network (LAN) operations, has not kept pace. The increasing complexity of video graphics used in personal computers is also demanding greater performance then can be conventionally provided.

Some of the problems were in the bus architecture used in IBM PC-compatible computers. The EISA architecture provided some improvement over the ISA architecture of the IBM PC/AT, but more performance was still required. To this end Intel Corporation, primarily, developed the Peripheral Component Interconnect (PCI) bus. The PCI bus is a mezzanine bus between the host or local bus in the computer, to which the processor and memory are connected, and the I/O bus, such as ISA or EISA. For more details on the PCI bus, reference to the PCI Standard Version 2.0, from the PCI Special Interest Group in care of Intel Corp., which is hereby incorporated by reference, is advised. The bus was designed to have a high throughput and to take advantage of the increasing number of local processors that support I/O functions. For example, most disk controllers, particularly SCSI controllers, and network interface cards (NICs) include a local processor to relieve demands on the host processor. Similarly, video graphics boards often include intelligent graphics accelerators to allow higher level function transfer. Typically these devices have the capability of operating as bus masters, to allow them to transfer data at the highest possible rates.

Because of the number of potential devices trying to be bus masters, an arbitration scheme is required. A common arbitration scheme is least-recently-used (LRU). In certain cases, such as described in application Ser. No. 07/955,499, entitled "Prioritization of Microprocessors in Multiprocessor Computer Systems," filed on Oct. 2, 1992, which is hereby incorporated by reference, the LRU scheme is modified so that the LRU of just the various requesters is utilized. This avoids potential deadlock conditions.

Another common type of arbitration scheme is the rotating priority scheme, where requesters are assigned highest priority on a rotating basis. In computer systems having a plurality of buses, such as those with a PCI bus and an EISA or ISA bus, a plurality of arbiters are required. It is thus desirable that an efficient arbitration scheme be developed for the plurality of arbiters for optimal usage of the plurality of buses.

SUMMARY OF THE PRESENT INVENTION

The arbitration circuitry according to the present invention includes a first arbiter for arbitrating access to a first bus and a second arbiter for arbitrating access to a second bus. The first arbiter preferably utilizes a modified least recently used priority scheme for arbitrating requests from bus masters connected to the first bus as well as bus masters connected to the second bus. The second arbiter preferably Utilizes a rotating type priority scheme for arbitrating requests from bus masters connected to the second bus as well as from bus masters connected to the first bus. The second arbiter performs a first level rotating priority arbitration between a plurality of requestor types. Certain events disturb the first level rotating priority scheme. These events include the assertion of a non-maskable interrupt, which causes requests from bus masters connected to the second bus to be masked or bypassed. Certain of the requestor types include a plurality of devices or channels, requiring a second level of arbitration to be performed. For one requestor type, a second level rotating priority arbitration is performed. For a second requester type, a fixed or rotating priority arbitration is performed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
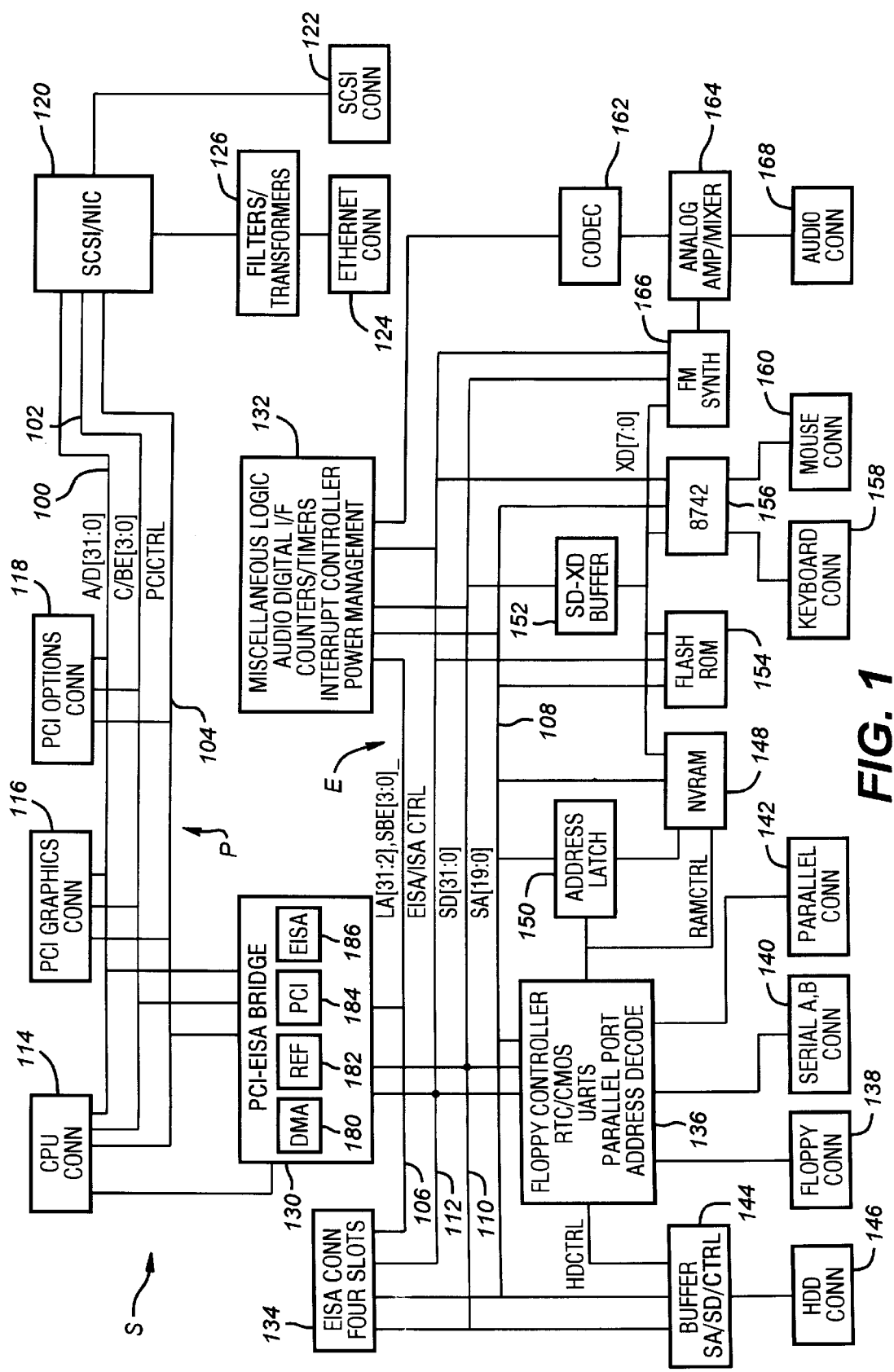
FIG. 1 is a block diagram of a system board including a plurality of arbiters according to the present invention.

Referring now to FIG. 1, the system board S of a computer system according to the present invention is shown. In the preferred embodiment, the system board contains circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The PCI bus P includes a clock signal PCICLK. The second primary bus on the system board S is the EISA bus E. The EISA bus E includes LA address portion 106, SA address portion 108, SD data portion 110 and EISA/ISA control signal portion 112. The EISA bus E includes a clock signal BCLK. The PCI and EISA buses P and E form the backbones of the system board S.

Figure 2A:
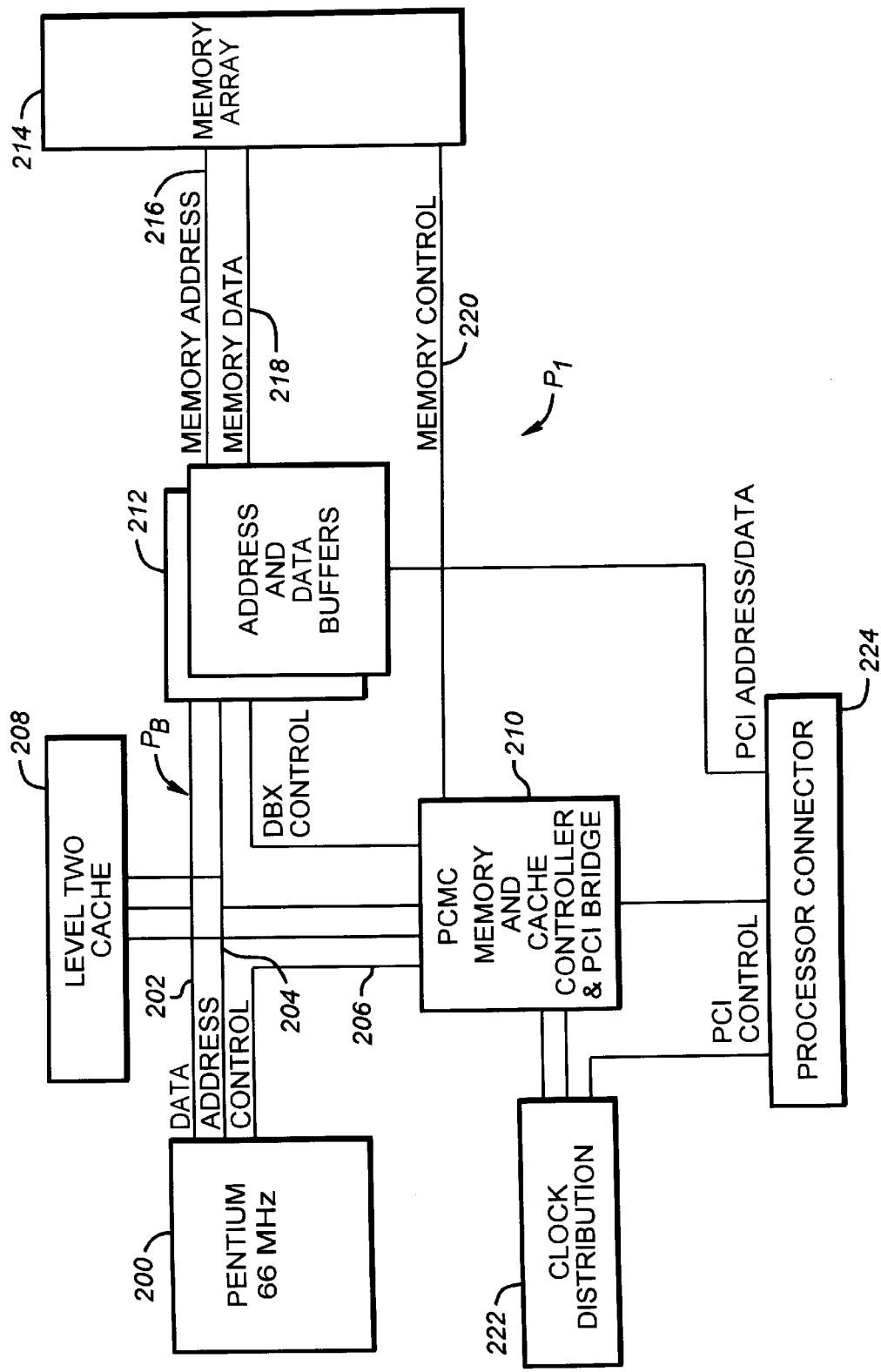
FIGS. 2A and 2B are block diagrams of alternate processor boards for use with the system board of FIG. 1.
Figure 2B:
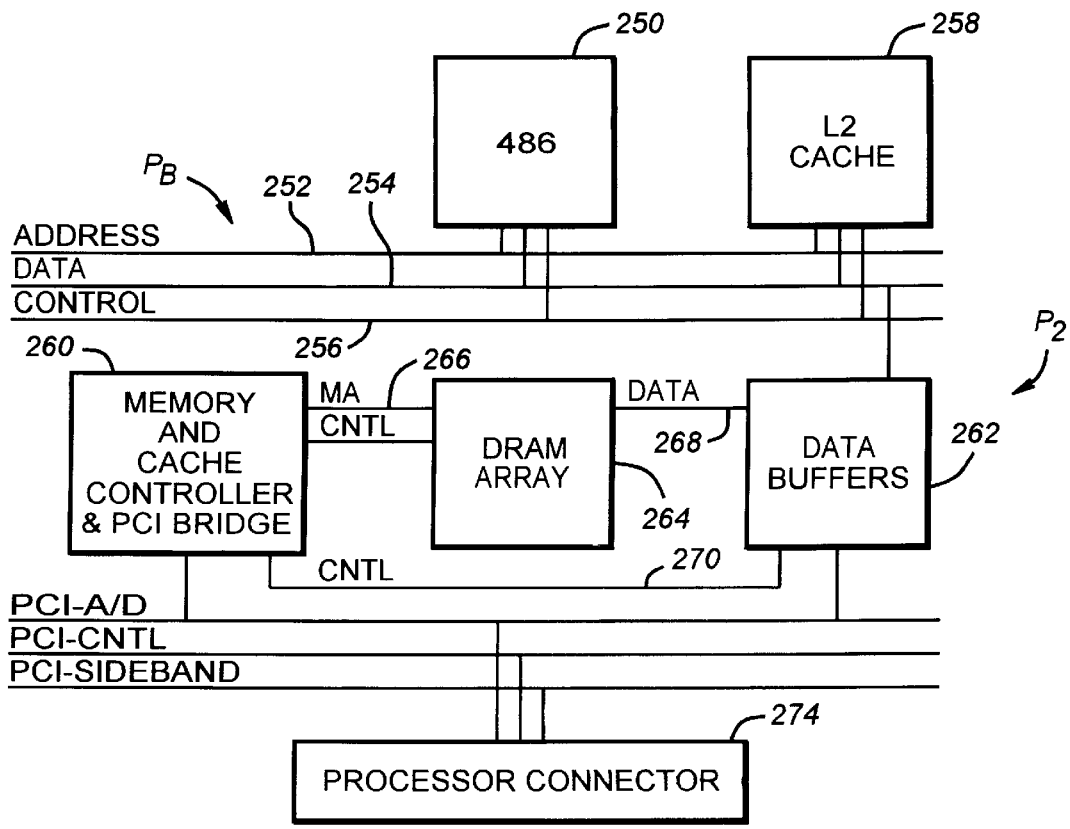
Figure 3:
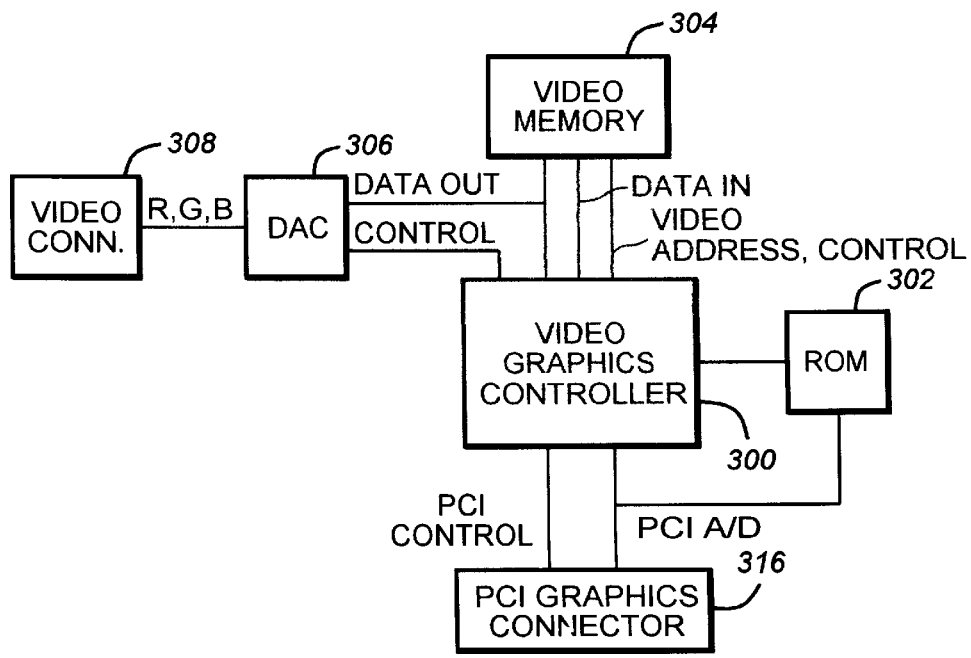
FIG. 3 is a block diagram of a video graphics controller board for use with the system board of FIG. 1.

A CPU connector 114 is connected to the PCI bus P to receive interchangeable processor cards, such as those shown in FIGS. 2A and 2B. A PCI graphics connector 116 is connected to the PCI bus P to receive a video graphics card as shown in FIG. 3. A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, bus master control logic for the PCI bus, and an EISA bus controller as conventionally used in EISA systems. The PCI-EISA bridge 130 also includes a DMA controller 180, a refresh controller 182 for performing hidden refresh cycles on the EISA bus E, a PCI arbiter 184 for arbitrating access to the PCI bus P, and a central arbitration controller for arbitrating access to the EISA bus E. Preferably the PCI-EISA bridge 130 is a single integrated circuit, but other combinations are possible.

A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIGS. 2A and 2B, alternate processor board designs are shown. In the processor board P1 of FIG. 2A, the CPU or processor 200 is the Pentium processor from Intel, preferably operating at 66 MHz. The processor 200 provides data, address and control portions 202, 204 and 206 to form a processor bus PB. A level 2 (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212. The address and data buffers 212 are preferably the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P1 and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 2B, an alternate processor card P2 is shown. In the processor card P2, the processor 250 is preferably a 486 class processor, such as the 486 S-class processors. Again, address, data and control portions 252, 254 and 256 are developed from the processor 250 to form a processor bus PB. An L2 cache memory 258 is connected to the processor bus PB, while a cache and memory controller and PCI bridge chip (CDC) 210, such as the 82424TX from Intel, is also connected to the processor bus PB. The CDC 210 controls the operations of the L2 cache 258, as similarly performed in processor card P1 by the PCMC 210. A main memory array 264 receives its address information directly from the CDC 260, as well as its control signals. Data buffers 262, preferably the 82423TX from Intel, are connected between the processor data portion 254 and a data bus 268 to the memory array 264. The data buffers 262 are controlled by the CDC 260. Again, a processor connector 274 is provided to be mateably received with the processor connector 114. The CDC 260 is connected to the processor connector 274, as are the data buffers 262.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above description of a computer system is provided for completeness and numerous variations could be developed as apparent to those skilled in the art.

Figure 4:
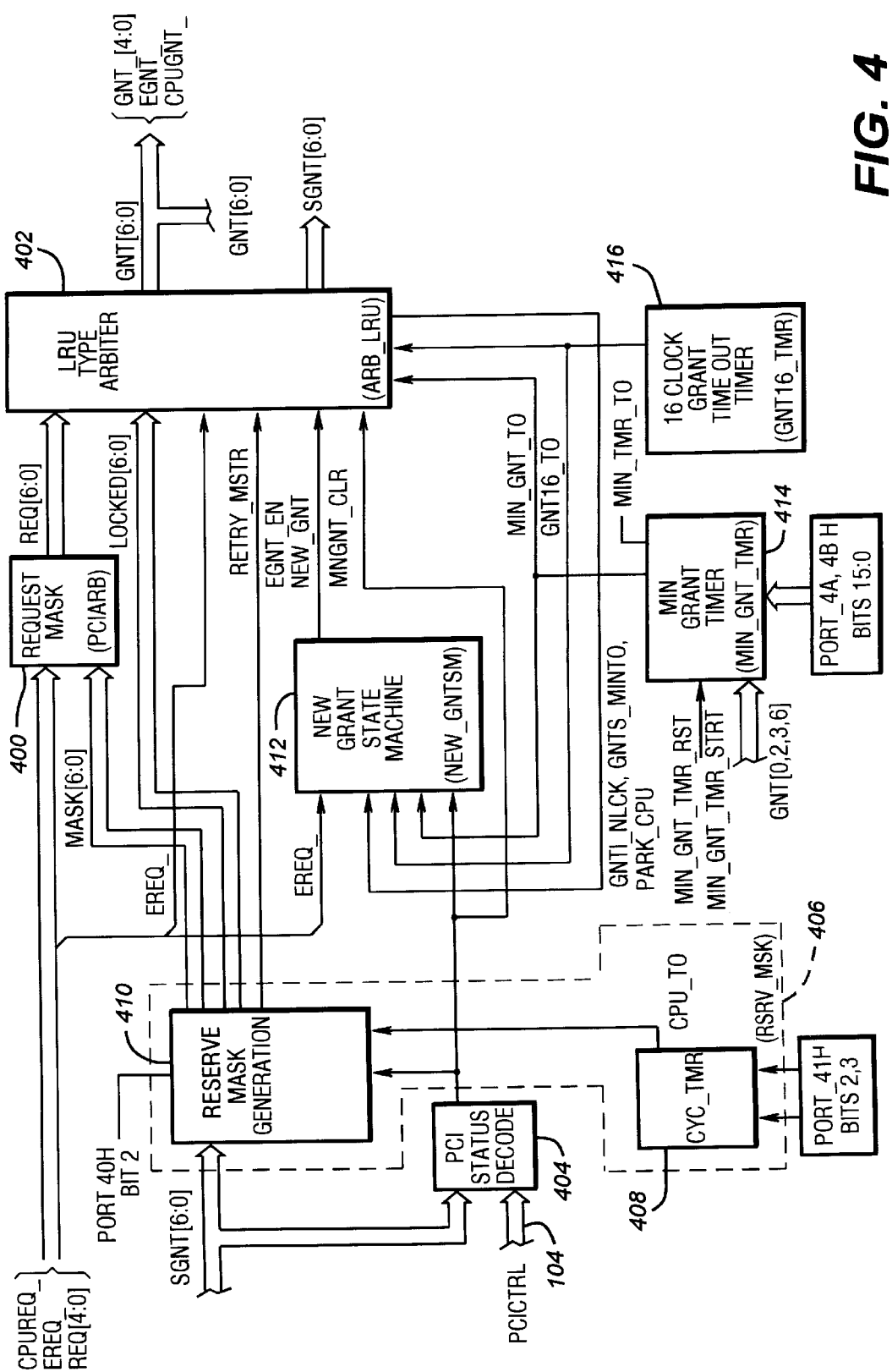
FIG. 4 is a block diagram of the PCI arbiter of FIG. 1.

Referring now to FIG. 4, the PCI arbiter 184 included in the PCI-EISA bridge 130 is illustrated. Six request signals, CPUREQ_, EREQ_ and REQ_[4:0] are provided to request mask logic 400. In this description a signal mnemonic ending in an underline indicates that it is an active low signal, while an exclamation point indicates an inverted signal. In the embodiment of the system board S shown in FIG. 1, it is understood that one of the PCI request signals REQ_[4:0] are not utilized. Thus expansion capability is provided for future systems. In the preferred embodiment, the signal REQ_[0] is provided by PCI options connector 118; the signal REQ_[1] is provided by the graphics connector 116; and the signals REQ_[2,4] are provided by the SCSI controller and NIC controller, respectively. The signal REQ_[3] is unused. The request mask logic 400 produces the REQ[6:0] signals to a modified true LRU arbiter 402.

For the remainder of this description the CPU receives the [0] designation, the EISA bus E receives the [1] designation, the option connector 118 receives the [2] designation, the graphics connector 116 receives the [3] designation and the SCSI/NIC controller 120 receives the [4] and [6] designations, with [5] being unused. The output of the arbiter 402 is a series of signals referred to as the GNT[6:0] and SGNT[6:0] signals. The GNT signals are used to develop the CPUGNT_, EGNT_ and GNT_[4:0] signals which are respectively the responses to the request signals provided to the request mask logic 400. The SGNT signals are the synchronized versions of the GNT signals, that is, they have been latched by a series of D-type flip-flops clocked on the PCICLK signal of the PCI bus P. The SGNT signals are provided to PCI status decode logic 404, which also receives the PCI control signals 104. Miscellaneous PCI cycle status signals are provided by the status decode logic 404. The SGNT signals are also provided to reservation and mask logic generally referred to as 406. As illustrated, the reservation and mask logic 406 includes two portions, a cycle timer 408, which receives two bits from an arbitrary I/O port, and reservation and mask generation logic 410, which receives one bit from an arbitrary I/O port. The output of the reservation and mask generation logic 410 is seven signals referred to as the MASK[6:0] signals, the priority masking signals, and seven signals referred to as the LOCKED[6:0] signals, which indicate which particular PCI bus master has locked the PCI bus P. Additionally, a signal referred to as RETRY_MSTR or retry master is provided to indicate that a master has been aborted and a retry cycle has occurred.

Figure 6:
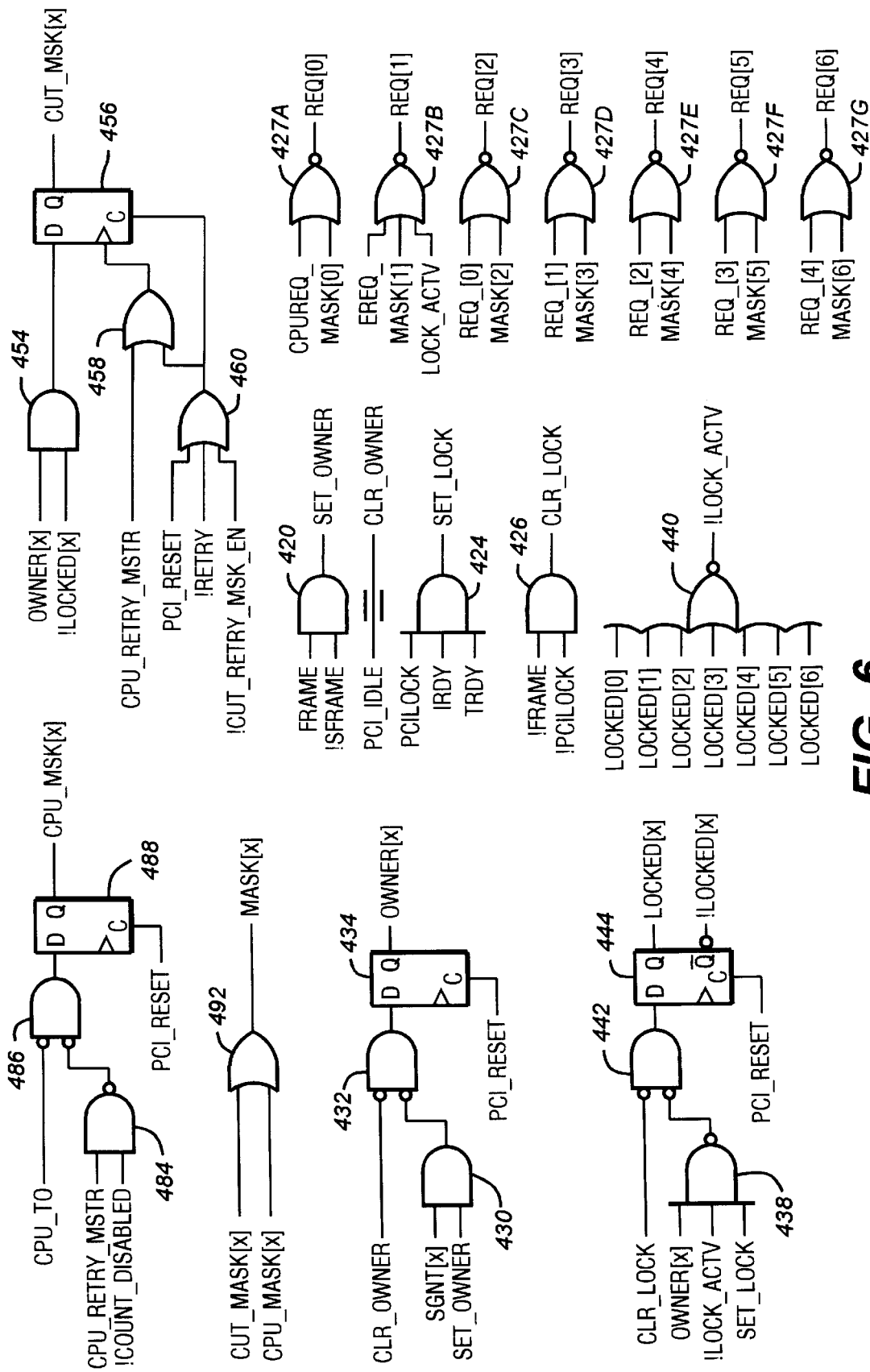
FIG. 6 is a schematic diagram of logic associated with the reservation and masking logic of FIG. 5.

The MASK signals are provided to the request mask logic 400, while the LOCKED signals and the RETRY_MSTR signal are provided to the arbiter logic 402. Referring briefly to FIG. 6, the signals REQ[0:6] are provided by NOR gates 427A–G, respectively. The inputs of the NOR gate 427A receive the signals CPUREQ_ and MASK[0]. The inputs of the NOR gate 427B receive the signals EREQ_, MASK[1] and LOCK_ACTV, where LOCK_ACTV is asserted high if any of the LOCKED[6:0] signals is asserted high. The inputs of the NOR gates 427C, 427D, 427E, 427F and 427G receive the following pairs of signals, respectively: REQ_[0] and MASK[2], REQ_[1] and MASK[3], REQ_[2] and MASK[4], REQ_[3] and MASK[5], and REQ_[4] and MASK[6].

In addition, the arbiter logic 402 receives the EREQ_ signal to determine if an EISA bus request is active. The EREQ_ signal is also provided to a new grant state machine 412, which is utilized to indicate when a new master can be granted control of the PCI bus P. Certain timers are associated with the grant phase, including the minimum grant timer 414 and a grant timeout timer 416. Sixteen bits of I/O from arbitrary ports are connected to the minimum grant timer 414, which also receives the GNT[0,2,3,6] signals and signals referred to as MIN_GNT_TMR_STRT and MIN_GNT_TMR_RST or minimum grant timer start and reset signals. The signals GNT[0,2,3,6] correspond to the CPU 100, the PCI options connector 118, the graphics connector 116, and the NIC controller, respectively. The minimum grant timer 414 produces two output signals referred to as the MIN_TMR_TO signal and the MIN_GNT_TO signals. Both of the signals indicate that the minimum grant timer 414 has timed out and that a new grant can occur.

The output of the grant timeout timer 416 is the GNT16_TO signal and is provided to indicate that an arbitration should occur as a sufficient period has elapsed without a new bus master starting activity. In addition, the arbiter logic 402 produces various signals referred to as the GNT1_NLCK, GNTS_MINTO and PARK_CPU signals to the new grant state machine 412 for reasons to be detailed below. The various blocks are detailed in the following description.

Figure 5:
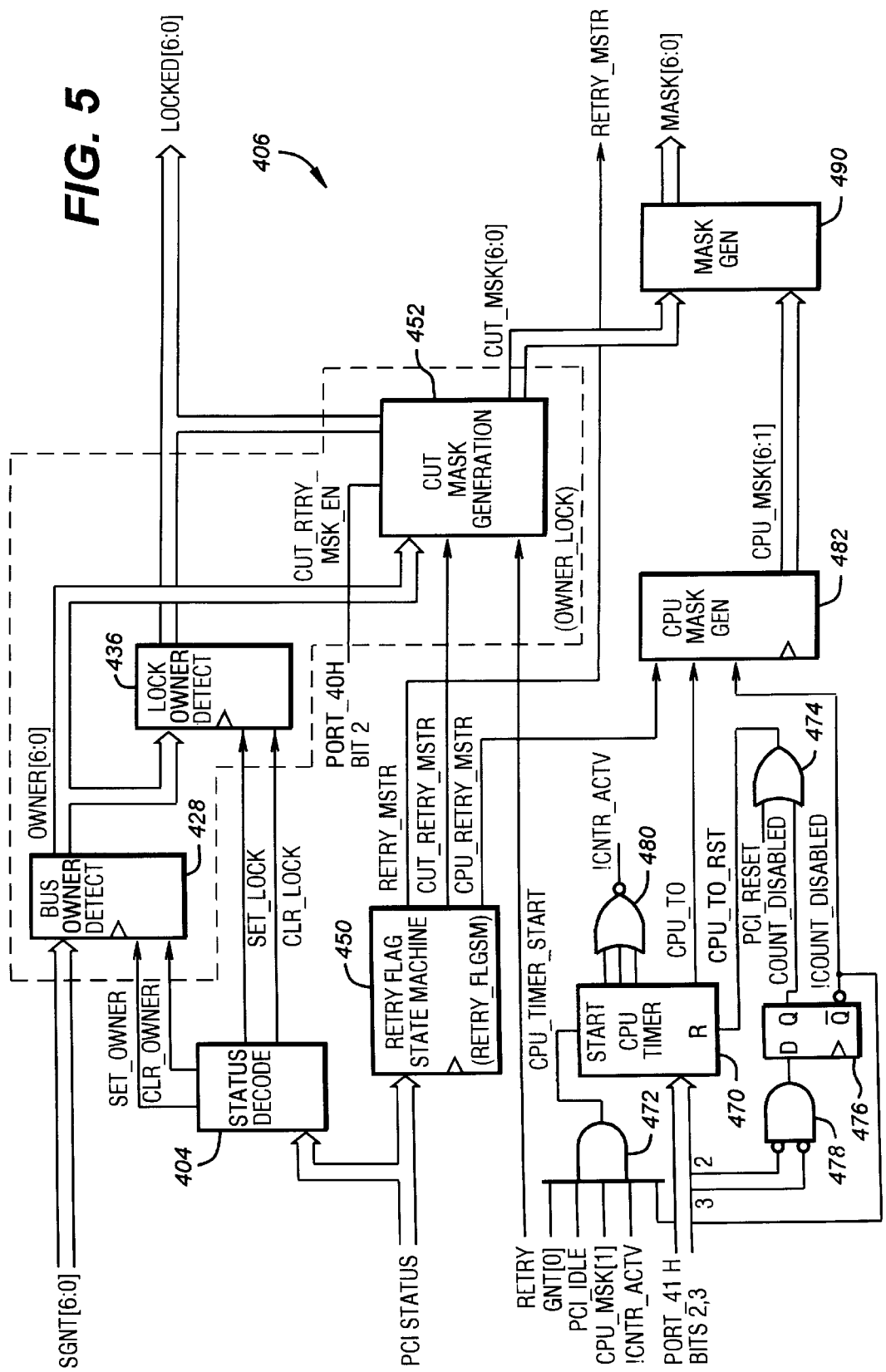
FIG. 5 is a block diagram of the reservation and masking logic of the PCI arbiter of FIG. 4.
Figure 14:
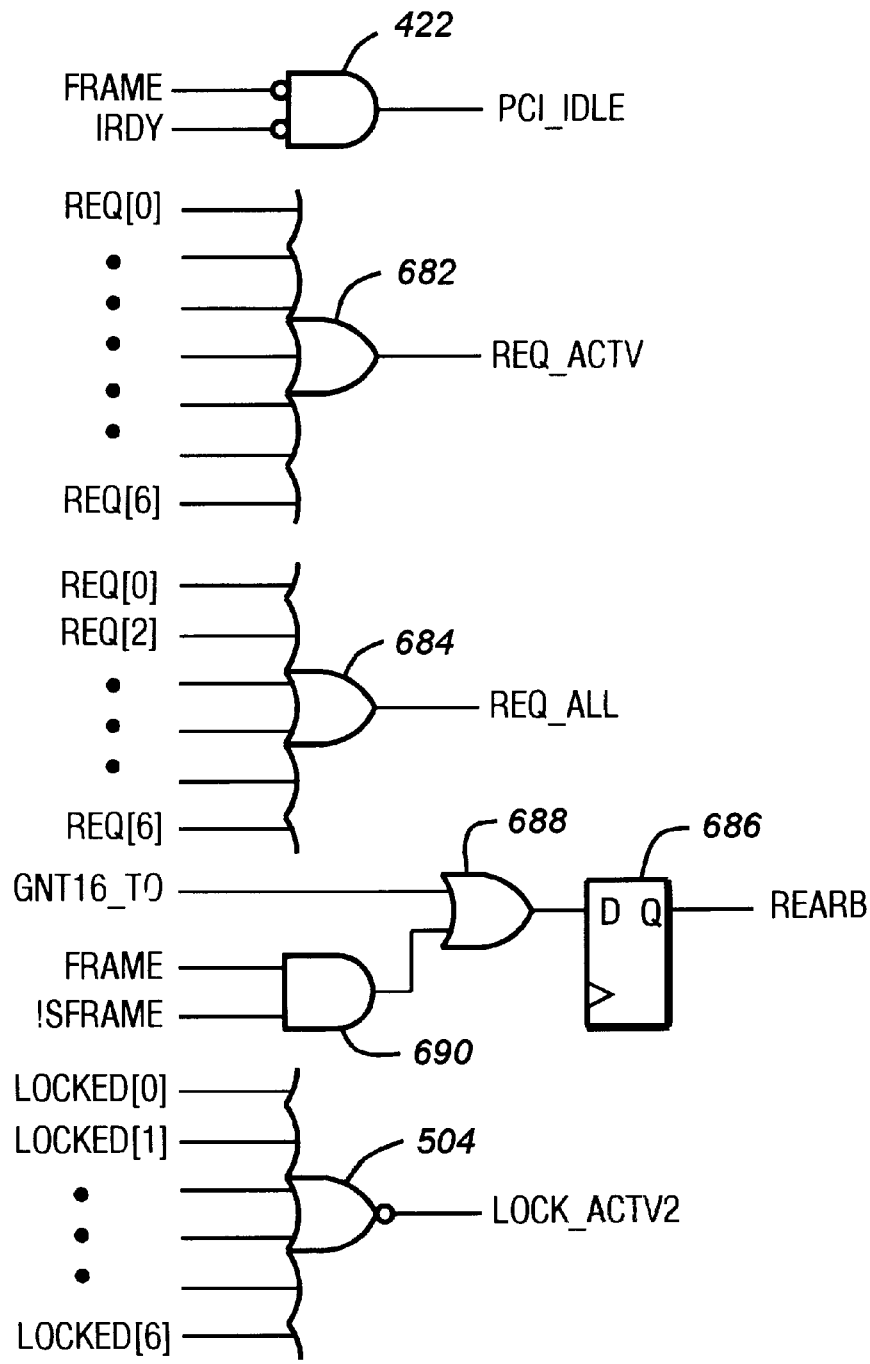

Referring now to FIG. 5, the reservation and mask logic 406 is illustrated. The status decode block 404 receives the PCI status signals and provides four signals, the SET_OWNER, CLR_OWNER, SET_LOCK and CLR_LOCK signals. Development of these signals is shown in FIG. 6. A signal referred to as the FRAME signal is provided as one input to a two-input AND gate 420. The second input is the !SFRAME signal or inverted version of a synchronized version of the FRAME signal. The output of the AND gate 420 is the SET_OWNER signal. A signal referred to as PCI_IDLE is the CLR_OWNER signal. The PCI_IDLE signal is provided as the output to a two-input NOR gate 422 (FIG. 14), whose inputs are the FRAME and IRDY signals from the PCI bus P. The SET_LOCK signal is provided as the output of a three-input AND gate 424, whose inputs are the IRDY signal, the TRDY signal and the PCILOCK signal. The CLR_LOCK signal is provided at the output of a two-input AND gate 426 whose inputs are the !FRAME or inverted FRAME signal and the inverted PCILOCK or inverted one PCICLK signal delayed PCI LOCK signal.

The SGNT[6:0] signals and the SET_OWNER and CLR_OWNER signals are provided as inputs to a bus owner detect logic 428. The bus owner detect logic 428 is used to provide a series of latched output signals referred to as OWNER[6:0], which refer to the owner of the PCI bus P. Detailed logic in the bus owner detect circuitry 428 is illustrated in FIG. 6. The SET_OWNER signal is provided as one input to a two-input NAND gate 430, whose second input receives the SGNT[x] signal, that is, the SGNT signal for the particular or x master. Only one example or channel of the logic is illustrated, the remaining portions being duplicated. This illustration of a single channel for exemplary purposes is utilized whenever possible in this description. The output of the NAND gate 430 is provided as one input to a two-input NOR gate 432, whose second input receives the CLR_OWNER signal. The output of the NOR gate 432 is provided to the D input of a D-type flip-flop 434, which receives the PCI_RESET signal, that is the reset signal on the PCI bus P, at its clear input and produces the OWNER[x] signal at its noninverting output. The flip-flop 434 is clocked by the PCICLK signal. It is noted in FIG. 6 that no connection is shown to the clock input of the flip-flop 434 and this is used uniformally throughout the Figures to indicate that the clocking input is the PCICLK signal. Where it is otherwise, a signal is provided to the clocking input of the particular flip-flop. The various PCICLK signal connections to the flip-flops have been omitted for clarity.

The OWNER[6:0], SET_LOCK and CLR_LOCK signals are provided as inputs to lock owner detect logic 436. The output of the lock owner detect logic 436 is the LOCKED[6:0] signals. Detailed development of the lock owner detect circuitry 436 is illustrated in FIG. 6. The OWNER[x] signal is provided as one input to a three-input NAND gate 438. The second input to the NAND gate 438 is the SET_LOCK signal, while the third input is the !LOCK_ACTV or not lock active signal. The !LOCK_ACTV signal is produced at the output of a seven-input NOR gate 440, with each of the LOCKED[6:0] signals being the seven inputs to the NOR gate 440. The output of the NAND gate 438 is provided as one input to a two-input NOR gate 442, whose second input receives the CLR_LOCK signal. The output of the NOR gate 442 is provided to the D input of a D-type flip-flop 444, which is cleared by the PCI_RESET signal. The non-inverting output of the flip-flop 444 is the LOCKED[x] signal, while the inverted output provides the !LOCKED[x] signal.

The PCI status signals are also provided to a RETRY FLAG state machine 450. The RETRY FLAG state machine is clocked by the PCICLK signal. The outputs of the RETRY FLAG state machine are the RETRY_MSTR signal, the CUT_RETRY_MSTR signal and the CPU_RETRY_MSTR signal. The CUT_RETRY_MSTR signal is used to indicate that a retry has been issued by the PCI-EISA bridge 130 and that the cycle which has been aborted was addressed to either the bridge 130 itself or to the EISA bus E. The conditions of this retry are further described below. The CPU_MSTR signal indicates that the processor/main memory initiated the retry of the particular cycle. The CUT_RETRY_MSTR signal is used to mask off the bus request of the particular master which was retried until the cycle can be retried without a need for a further retry, while the CPU_RETRY_MSTR signal is used to mask off all but the processor/main memory from the next arbitration cycle, so that it effectively has highest priority.

Figure 7:
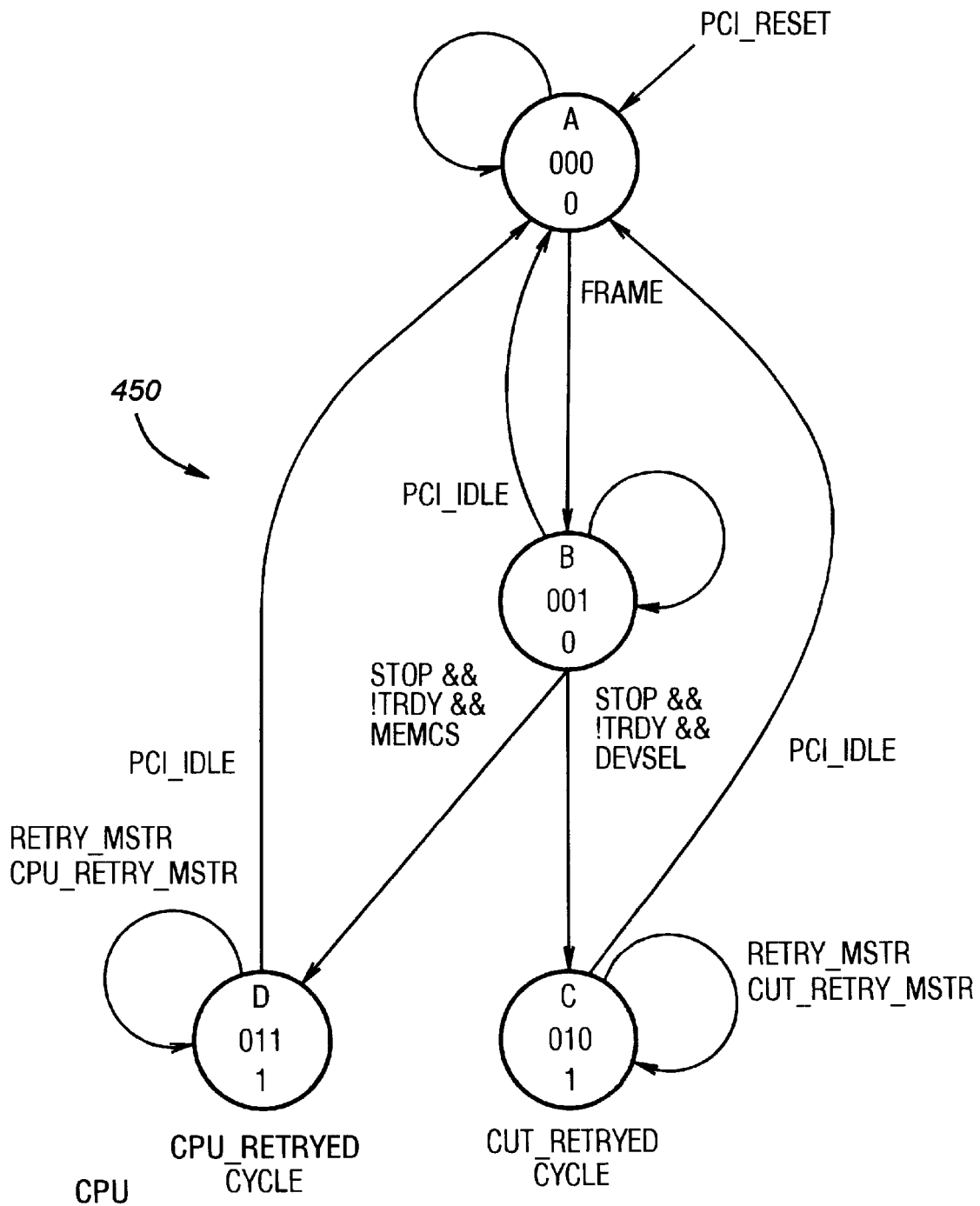
FIG. 7 is a state machine for tracking cycles to indicate when a retry has occurred to prevent reprioritization.

The RETRY FLAG state machine 450 is illustrated in FIG. 7. Operation of the state machine commences at state A upon receipt of the PCI_RESET signal. When the FRAME signal is asserted, control proceeds to state B. Otherwise control remains at state A. If the PCI_IDLE signal is asserted in state B, control returns to state A. If the STOP signal in the PCI bus P is asserted, the TRDY signal is not asserted and the MEMCS or memory chip select signal is asserted, control proceeds to state D. This is an indication that an operation directed to memory, i.e. the processor card, has been detected and is to be retried. If the STOP signal is asserted, as well as a DEVSEL or device select signal which indicates that the EISA bus E or another portion of the PCI-EISA bridge 130 has been selected, and the TRDY signal is not asserted, control proceeds to step C. This is an indication that the PCI-EISA bridge 130 has indicated that the cycle is to be retried. Otherwise control remains at state B. Control proceeds from state D to state A upon assertion of the PCI_IDLE signal and otherwise remains in state D. During state D the RETRY_MSTR and CPU_RETRY_MSTR signals are asserted. Control proceeds from state C to state A when the PCI_IDLE signal is asserted. While the state machine is in state C the RETRY_MSTR and CUT_RETRY_MSTR signals are asserted. Thus the state machine 450 indicates when a cycle has been retried and whether it was directed to the processor, that is the main memory, or to the EISA bus E or a device under control of the PCI-EISA bridge 130.

The OWNER[6:0] and LOCKED[6:0] signals and the CUT_RETRY_MSTR signal are provided to the CUT mask generation logic 452, which also receives a signal referred to as the CUT_RETRY_MSK_EN or cut retry mask enable signal from a bit in an arbitrary I/O port. This bit is used to enable or disable operation of the feature wherein the bus request signal of a requesting bus master which has been retried based on an access to the PCI-EISA bridge 130 is masked until the cycle can be completed without a further retry. When this feature is disabled, which is not preferable, then the master may repeatedly retry prior to the data being available. The output of the CUT mask generation logic 452 is the CUT_MSK[6:0] signals. Further details of the logic are provided in FIG. 6. The OWNER[x] and !LOCKED[x] signals are the inputs to a two-input AND gate 454. The output of the AND gate 454 is connected to the D input of a D-type flip-flop 456. The non-inverted output of the flip-flop 456 is the CUT_MSK[x] signal. The clocking signal to the flip-flop 456 is provided by the output of a two-input OR gate 458 which receives the CUT_RETRY_MSTR signal at one input and the output of a three-input OR gate 460 at its second input. The output of the OR gate 460 is also provided to the clear input of the flip-flop 456. The OR gate 460 receives the PCI_RESET, !RETRY and !CUT_RETRY_MSK_EN signals. The RETRY signal is provided under several conditions. First, a cycle is directed to the EISA bus E, but another cycle is already in progress on the EISA bus E. One example is when a prior master has posted a write operation to the EISA bus E and that write operation is occurring. Second, a cycle is directed to the EISA bus E when a refresh cycle on the EISA bus E is pending or is in progress. The third condition is when the PCI-EISA bridge 130 is the responding PCI slave, a lock has been set and the requesting bus master is not the locking bus master. This condition occurs as the PCI-EISA bridge 130 must not execute a cycle as a locked resource to any master except the one placing the lock. The RETRY signal is asserted when any of these events occur and is removed or negated when the assertion event is completed, such as the lock being released, the posted write completing or the refresh completing. The PCI-EISA bridge 130 can obviously determine when it is unlocked and can determine the other two events as it is performing the posted write operation and it includes the refresh controller. Therefore if a cycle directed to the PCI-EISA bridge 130 is retried, and the PCI-EISA bridge 130 is not locked, then the CUT_MSK bit is set to allow this master's bus request to be masked until the retry source event is completed.

As mentioned above, there are certain conditions when a PCI master is retried when referencing the memory. Then it is desirable to mask off all of the other request lines other than the one from the processor/main memory. It is desirable that this period be programmable because of varying processor speeds and other variables. To this end, two bits are utilized to define four options. The 00 value indicates that masking is disabled, while the other three combinations refer to 4, 6 and 8 PCICLK signal delays. These bits are provided to a CPU timer 470, with the CPU timer 470 being clocked by the PCICLK signal. The timer 470 is started upon receipt of a signal which is provided by the output of a five-input AND gate 472. The inputs to the AND gate 472 are the GNT[0] signal, the PCI_IDLE signal, the CPU_MSK[1] signal, the !CNTR_ACTV signal and the !COUNT_DISABLED signal. So when the timer 470 is not disabled, and not active, the PCI bus P is idle because of the retry, the EISA bus E is masked and the PCI bus P has been granted to the CPU, then the timer 470 is started by loading in the value indicated by the two bits from the arbitrary I/O port and counts down from the loaded value. The timer 470 is reset by the output of a two-input OR gate 474. One input to the OR gate 474 is the PCI_RESET signal and the other input is provided by the non-inverting output of a D-type flip-flop 476. The D input of the flip-flop 476 receives the output of a two-input NOR gate 478 which receives at its inputs the two bits to define the time interval. The inverting output of the flip-flop 476 is the !COUNT_DISABLED signal. The timer 470 is preferably a three bit timer and the three output bits are provided as three inputs to a three-input NOR gate 480 whose output is the !CNTR_ACTV signal. The final output of the timer 470 is the CPU_TO or CPU timeout signal which is provided when the timer 470 has counted down to 0 from the loaded value.

The CPU_RETRY_MSTR, CPU_TO and !COUNT_DISABLED signals are provided to the CPU mask generation logic 482, which provides the CPU_MSK[6:1] signals. It is noted that a 0 signal is not provided as the CPU itself is not masked as it is intended to be the priority device. Details of the CPU mask generation logic 482 are provided in FIG. 6. The CPU_RETRY_MSTR signal is provided as one input to a two-input NAND gate 484, with the other input receiving the !COUNT_DISABLED signal. The output of the NAND gate 484 is provided as one input to a two-input NOR gate 486 with the second input receiving the CPU_TO signal. The output of the NOR gate 486 is provided to the D input of a D-type flip-flop 488 whose non-inverted output provides the CPU_MSK[x] signal. The flip-flop 488 is reset by the PCI_RESET signal. Thus the CPU_MSK[6:1] signals are set when the CPU_RETRY_MSTR signal is provided and cleared when the CPU_TO signal is provided.

The CUT_MSK[6:0] and CPU_MSK[6:1] signals are provided to mask generation logic 490. The output of the mask generation logic 490 is the MASK[6:0] signals to indicate which bus request signals are to be masked from the actual prioritization process. Details of the circuitry are provided in FIG. 6. The CUT_MASK[x] and CPU_MSK[x] signals are provided as the two inputs to a two-input OR gate 492 whose output is the MASK[x] signal. It is noted that a CPU_MSK[0] signal is not provided so that the MASK[0] signal is simply the CUT_MSK[0] signal.

Figure 8:
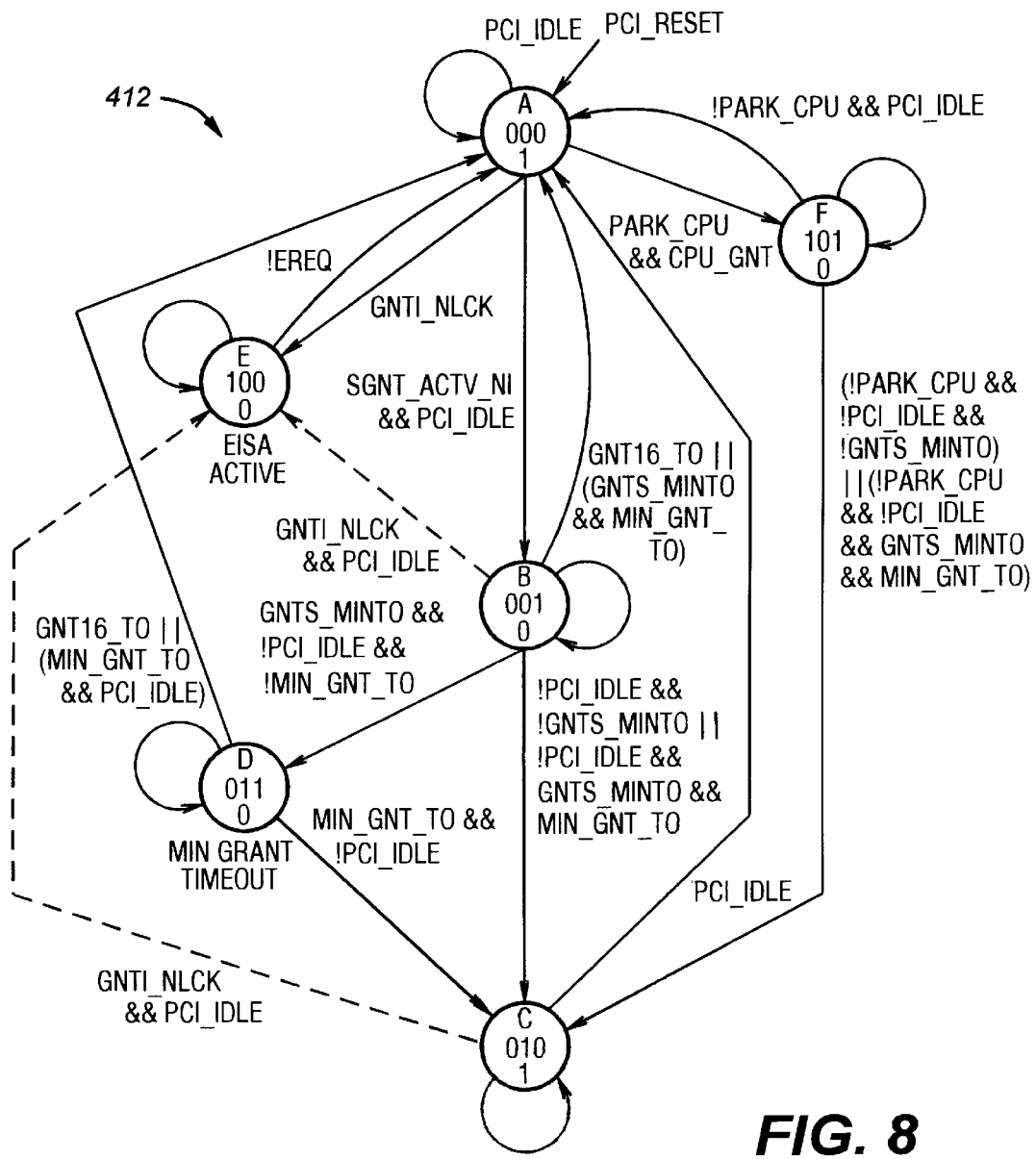
FIG. 8 is a state machine for determining when a new master has been granted the bus.
Figure 13:
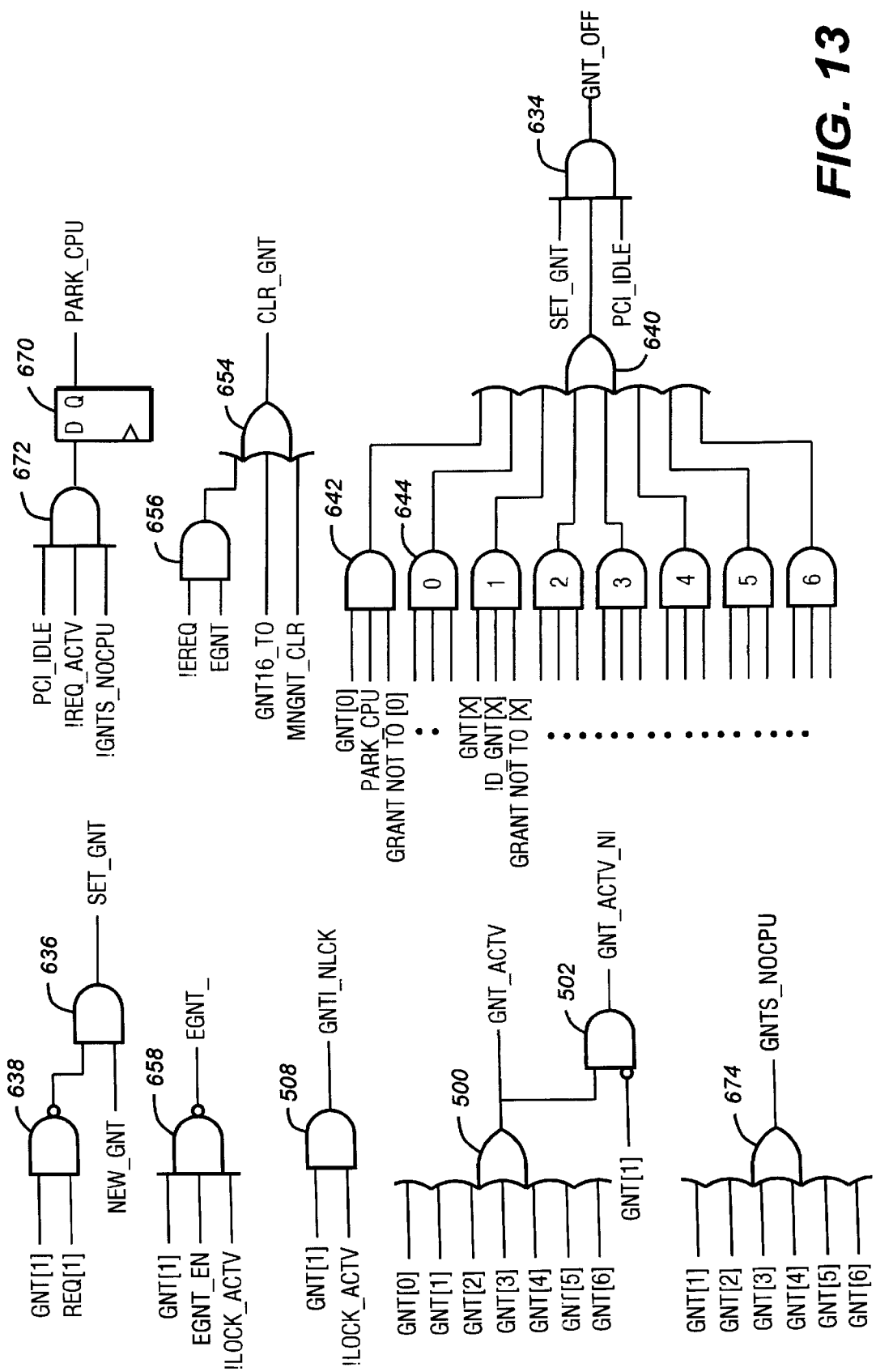

The operation of the new grant state machine 412 is illustrated in FIG. 8. Control begins at state A upon receipt of the PCI_RESET signal. If there is an active grant as indicated by the GNT_ACTV signal, control proceeds to state B. The GNT_ACTV signal is produced as a seven-input OR gate 500 (FIG. 13). The seven inputs to the OR gate 500 are the GNT[6:0] signals. The GNT_ACTV signal is also provided as one input to a two-input AND gate 502, whose other input is inverted and receives the GNT[1] signal. The output of the AND gate 502 is the GNT_ACTV_N1 or grant active except for EISA signal. The SGNT_ACTV_N1 signal is the synchronized version of the GNT_ACTV_N1 signal. Thus, when the signal SGNT_ACTV_N1 and the signal PCI_IDLE are asserted, the state machine transitions from state A to state B.

Control proceeds from state A to state E if the GNT1_NLCK signal is present, indicating that the EISA bus E has control of the PCI bus P and no lock signal is active, as indicated by the LOCK_ACTV2 signal. The GNT1_NLCK signal is provided as the output of a two-input AND gate 508 (FIG. 13). The inputs to the AND gate 508 are the GNT[1] signal and the !LOCK_ACTV signal. Control proceeds from state A to state F if the PARK_CPU signal is asserted and the CPU_GNT or GNT[0] signal is asserted. PARK_CPU is an indication that no one has requested the bus and therefore the CPU is given priority as the default owner. In all other cases, control remains at state A.

Control proceeds from state E to state A when the !EREQ signal is true, that is, when the EISA request signal is not present. Otherwise, control remains at state E. Thus, once the EISA bus E has gained ownership of the PCI bus P, it remains there until its operation is completed. Control proceeds from state B back to state A if the GNT16_TO signal is true or if the GNTS_MINTO and MIN_GNT_TO signals are true. As indicated above, the GNT16_TO signal indicates that 16 PCICLK cycles have elapsed without activity on the bus, while the GNTS_MINTO and MIN_GNT_TO signal term indicates that certain masters having minimum grant times have control of the bus and the minimum grant timer 414 has timed out. Control proceeds from state B to state D when the GNTS_MINTO signal is true, the PCI_IDLE signal is not asserted and the MIN_GNT_TO signal is not asserted. This is an indication that the minimum grant time has not expired and the bus master is active on the bus so that no grants are disabled. Control proceeds from state B to state C when the !PCI_IDLE signal is true and the !GNTS_MINTO signal is true or if it is not a PCI_IDLE condition and the GNTS_MINTO and MIN_GNT_TO signals are asserted. This indicates that the bus is active and it has either timed out or is not subject to a minimum grant time. In a case which should not normally occur, control proceeds from state B to state E when the GNT1_NLCK and PCI_IDLE signals are asserted. Otherwise control remains at state B.

Control proceeds from state D back to state A if the GNT16_TO signal is true or if the MIN_GNT_TO signal is true and the PCI_IDLE signal is true, indicating either a period of sufficient inactivity without a bus master taking control of the bus or the minimum grant time has expired and the bus is idle. Control proceeds from state D to state C if the MIN_GNT_TO signal is true and the bus is not idle, as indicated by the !PCI_IDLE signal. This is a case when the bus master is still active after the minimum grant time. Otherwise control remains at state D. Thus an exit from state D indicates that all of the minimum grant time outs have elapsed.

Control proceeds from state C to state A when the PCI_IDLE signal is asserted, indicating that the PCI bus P is idle. Control proceeds from state C to state E in the improper condition where the GNT1_NLCK and PCI_IDLE signals are asserted. Otherwise control remains at state C.

Control proceeds from state F back to state A if the !PARK_CPU signal is asserted and the bus is idle. Control proceeds from state F to state C under numerous conditions, the first of which is that the !PARK_CPU signal is true, the !PCI_IDLE signal is true and the !GNTS_MINTO signal is true. This term is used when the CPU is not to be the default master, the bus is not idle and a bus master with a minimum grant time is not in control. The second condition for the transfer is if the !PARK_CPU signal is true, the !PCI_IDLE signal is true, the GNTS_MINTO signal is true and the MIN_GNT_TO signal is true, indicating that the minimum grant time has elapsed and the bus is not idle. In all other cases control remains at state F.

Figure 9:
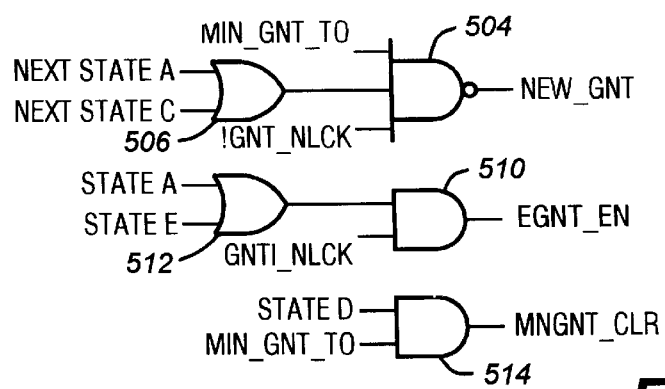
FIG. 9 is a schematic diagram of logic associated with the state machine of FIG. 8.

FIG. 9 illustrates the outputs of the new grant state machine 412. The NEW_GNT signal is provided as the output of a three-input NAND gate 504. The MIN_GNT_TO signal and the !GNT1_NLCK signals are two inputs to the NAND gate 504, while the third input is provided by the output of a two-input OR gate 506. The inputs to the OR gate 506 are signals that indicate that the next state of the state machine 412 will be state A or state C. Thus the NEW_GNT signal is active when either the bus has gone idle or the minimum grant time, if any, has elapsed. The EGNT_EN or EISA grant enable signal is provided as the output of a two-input AND gate 510, one of which inputs receives the GNT1_NLCK signal. The remaining input is provided by the output of a two-input OR gate 512 whose inputs indicate that the state machine is in state A or state E. Thus the EGNT_EN signal is active when either the bus has been idle or the EISA bus E is in control and the signal GNT1_NLCK is asserted. The final output of the new grant state machine 412 is the MNGNT_CLR signal, which is provided as the output of a two-input AND gate 514 whose inputs are a signal that indicates that the state machine is in state D and the MIN_GNT_TO signal. The signal MNGNT_CLR is one condition for cleaning the GNT[6:0] signals.

The minimum grant timer 414 is designed so that particular devices, in the preferred embodiment, particularly the CPU, the device in the option connector 118, the graphics controller and a further device, can have certain minimum grant or bus access times to allow them to do at least certain minimal operations. This is in contrast and different from the GNT_TO timer 416, which is used to determine if a device has not responded within the first 16 PCICLKs after receiving the PCI bus P, in which case mastership is transferred. The MIN_GNT timer logic 414 assures that once the particular device obtains the bus, it has it for a minimum number of PCICLK cycles. To this end sixteen data bits are provided to the timer 414 to specify the minimum times for the four particular devices in the preferred embodiment. When the minimum grant timer 414 is started, this time value is loaded into a countdown timer which then counts down to zero.

Figure 10:
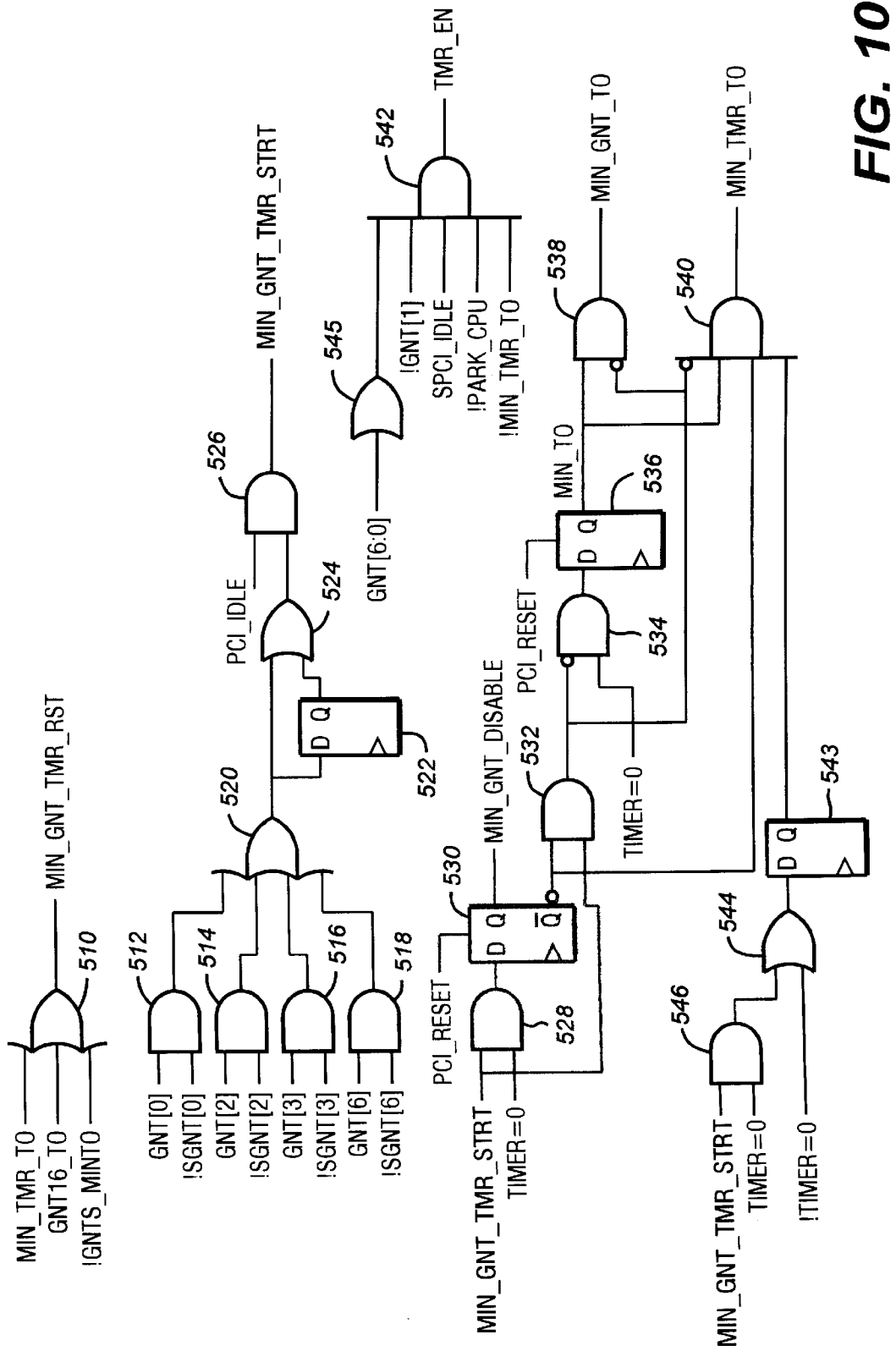
FIG. 10 is a schematic diagram of logic and circuitry associated with minimum grant timer of FIG. 4.

Referring now to FIG. 10, the timer 414, which is clocked by the PCICLK signal, receives a signal referred to as MIN_GNT_TM_RST or minimum grant timer reset. This signal is provided as the output to a three-input OR gate 510. The three inputs to the OR gate are the MIN_TMR_TO signal, which is actually an output of the minimum grant timer 414; the GNT16_TO signal, to indicate that the initial idle bus timer has elapsed; and the !GNTS_MINTO signal. When this signal is high, the minimum grant timer 414 is reset.

The MIN_GNT_TMR_STRT signal is used to start the timer 414. To this end the GNT[0] and !SGNT[0] signals are provided to a two-input AND gate 512. Similarly, the GNT and !SGNT signals for bus masters 2, 3 and 6 are provided to AND gates 514, 516 and 518. The outputs of the AND gates 512, 514, 516 and 518 are the inputs to a four-input OR gate 520, whose output is provided to a D-type flip-flop 522 and to one input of a two-input OR gate 524. The non-inverting output of the flip-flop 522 is provided as the second input to the OR gate 524. The output of the OR gate 524 is provided to one input of a two-input AND gate 526, whose other input receives the PCI_IDLE signal. The output of the AND gate 526 is the MIN_GNT_TMR_STRT signal. Thus the timer 414 is started when the PCI bus P is idle and a grant has been provided to one of the appropriate bus masters 0, 2, 3, or 6.

The MIN_GNT TMR_STRT signal is provided to one input of a two-input AND gate 528. The second input of the AND gate 528 receives an indication that the timer 414 has counted down to 0, that is, the minimum grant time for the particular device has elapsed. The output of the AND gate 528 is provided to the D input of a D-type flip-flop 530, whose preset input is connected to the PCI_RESET signal. The non-inverting output of the flip-flop 530 is the MIN_GNT_DISABLE signal, which is used to stop the timer 414. The inverted output of the flip-flop 530 is connected to one input of a two-input AND gate 532, with the other input receiving the MIN_GNT_TMR_STRT signal. The output of the AND gate 532 is provided to an inverted input of a two-input AND gate 534, with the other input receiving the signal indicating that the timer 414 has counted down to 0. The output of the AND gate 534 is provided to the D input of a D-type flip-flop 536, with the PCI_RESET signal being provided to the preset input. The output of the flip-flop 536 is the MIN_TO or minimum timeout signal, which is provided to one input of a two-input AND gate 538 and to one input of a four-input AND gate 540. The second input to the AND gate 538 is inverted and is connected to the output of the AND gate 532. Similarly, the output of the AND gate 532 is connected to an inverted input of the AND gate 540. The inverted output of the flip-flop 530 is connected to the third input of the AND gate 540, while the non-inverted output of a D-type flip-flop 543 is connected to the fourth input of the flip-flop 540. The D input of the flip-flop 543 receives the output of an OR gate 544, whose inputs are the !TIMER=0 signal, which indicates that the timer has not counted down to zero after being loaded, and the output of a two-input AND gate 546, whose inputs are the MIN_GNT_TMR_STRT signal and the TIMER=0 signal. The output of the AND gate 538 is the MIN_GNT_TO signal while the output of the AND gate 540 is the MIN_TMR_TO signal. Thus in this manner when the MIN_GNT_TMR_STRT signal is received, the timer 414 is loaded with the proper value and commences counting down operations. This continues until the timer 414 reaches zero, at which time the MIN_GNT_TO signal and the MIN_TMR_TO signal are asserted to indicate a timeout.

It has been noted that the grant time out timer 416 counts a 16 PCICLK period after it obtains control of the PCI bus P. The timer 416 is enabled by the output of a five-input AND gate 542. Four of the inputs to the AND gate 542 are the !GNT_[1] signal; the SPCI_IDLE signal, which is the synchronized version of the PCI_IDLE signal; the !PARK_ CPU signal, and the !MIN_TMR_TO signal. The fifth input is provided by the output of a seven-input NAND gate 545 which receives the seven GNT signals. Thus the timer 416 is activated by AND gate 542 when any of the bus masters has been granted the bus, except for the EISA bus E acting as master, and the PCI bus P has been idle but not by default to the CPU. The timer 416 then counts for 16 PCICLK periods and then issues the GNT16_TO signal to indicate that it has timed out.

Figure 11:
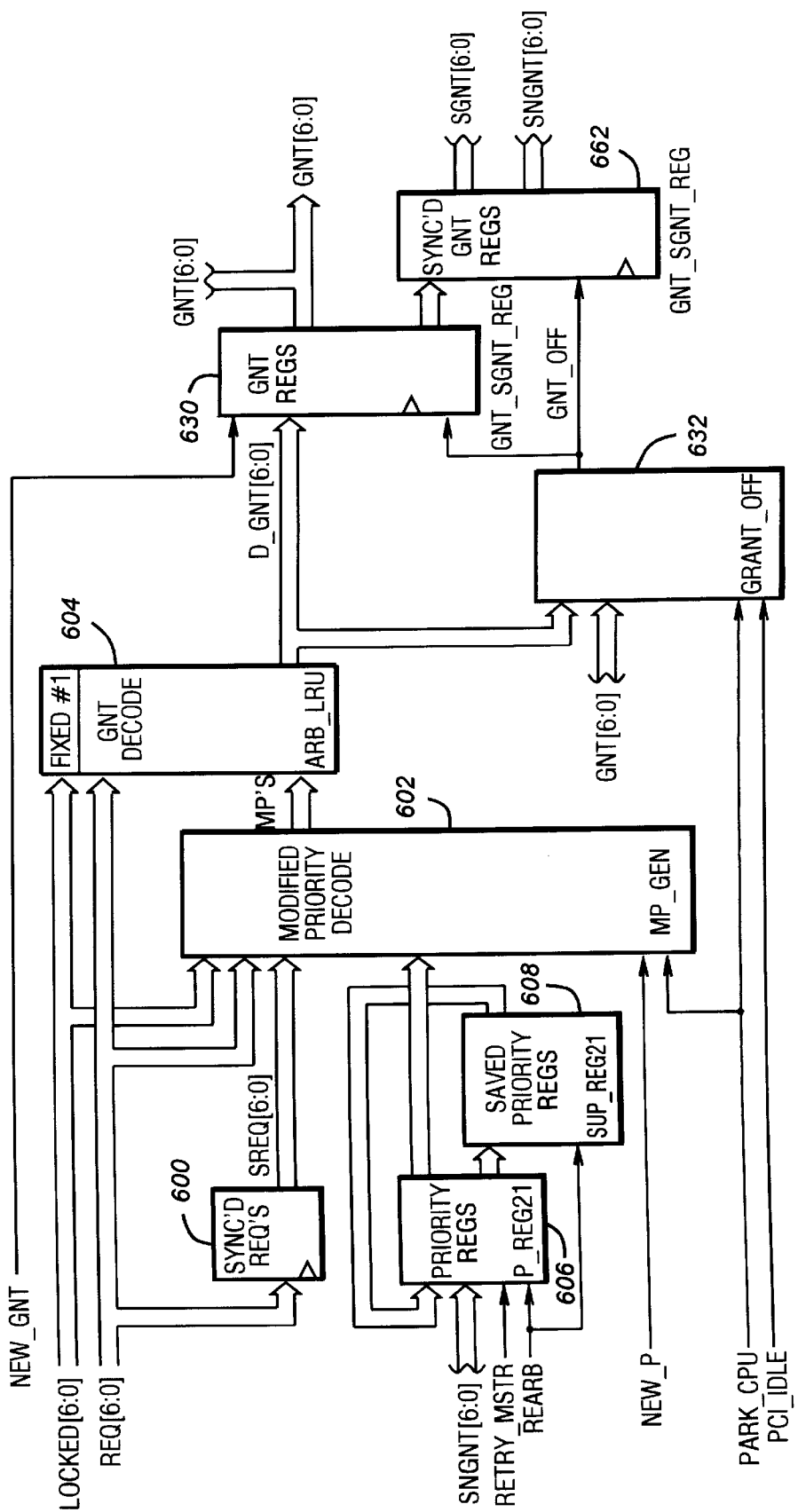
FIG. 11 is a block diagram of the modified LRU arbiter of FIG. 4.

FIG. 11 shows a more detailed block diagram of the LRU type arbiter logic 402. The REQ[6:0] signals are provided to a series of seven D-type flip-flops 600, which synchronize the REQ signals to produce the SREQ[6:0] signals. Additionally, the REQ[6:0] signals are provided to the modified priority decoder 602 and to the actual grant decoder or arbiter 604. The SREQ[6:0] signals are provided to the modified priority decoder 602. Further, the LOCKED [6:0] signals are provided to both the grant decoder 604 and the modified priority decoder 602.

A series of priority registers 606 are used to determine the particular priority of the various masters with respect to each other. To this end the SNGNT[6:0] signals, the synchronized and negative edge stored GNT signals, are provided to priority registers 606, as are the RETRY_MSTR and REARB signals. In addition, the output of saved priority registers 608 is provided to the priority registers 606. The output of the priority registers 606 are provided to the saved priority registers 608 and to the modified priority decode logic 602. The modified priority logic 602 also receives the PARK_CPU signal to be utilized when no master is requesting the PCI bus P.

Figure 12:
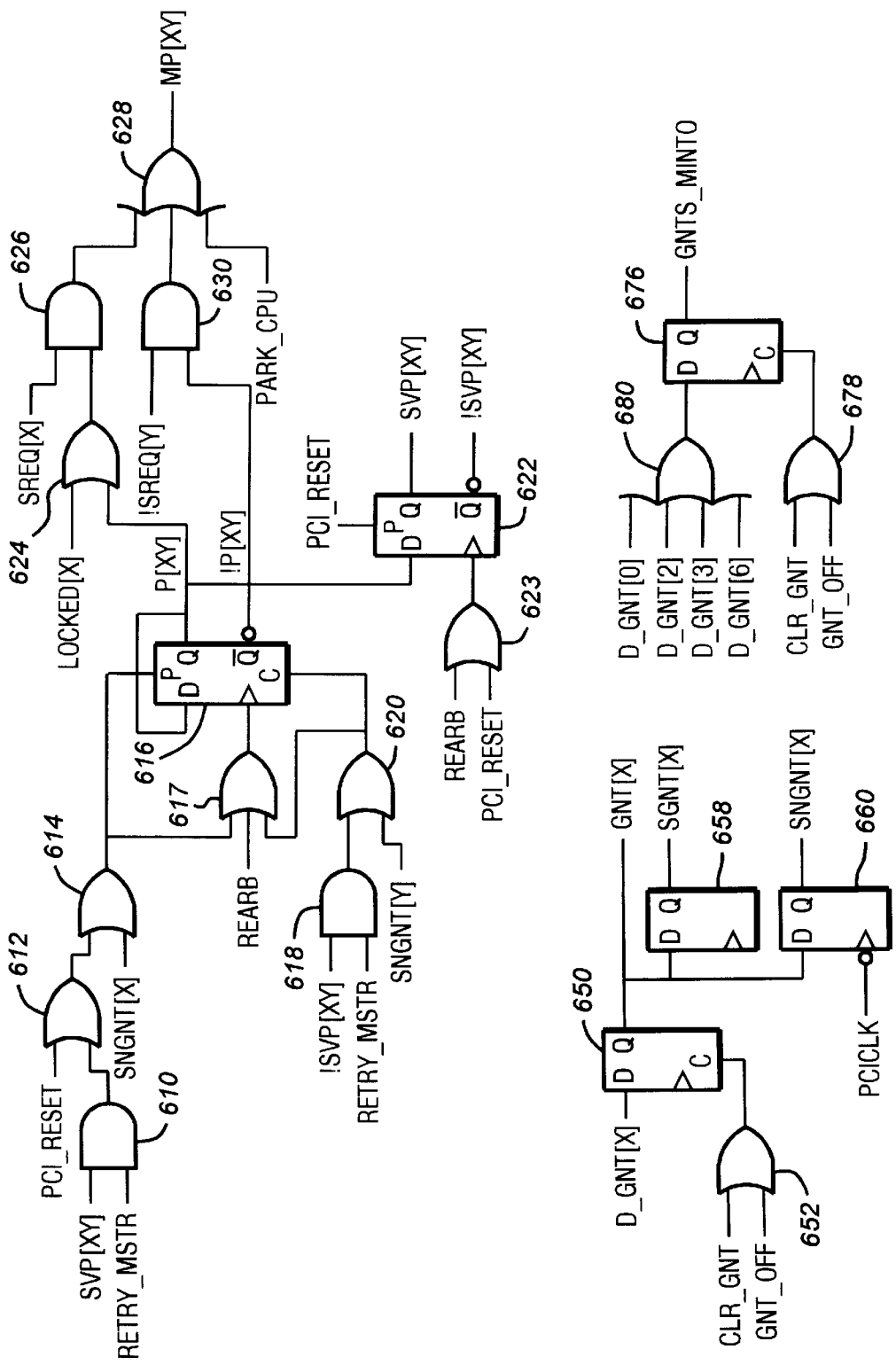
FIGS. 12, 13 and 14 are schematic diagrams of circuitry associated with the arbiter of FIG. 11.

A more detailed schematic of modified priority decode logic 602 and priority and saved priority registers 606 and 608 is provided in FIG. 12. It is noted that 21 bits are stored by the priority register 606 and the saved priority register 608. This corresponds to 1 bit for each combination of bus masters. As an example, 1 bit is provided for bus master 0 versus bus master 6, one for bus master 0 versus bus master 5 and so. In the following discussion this is referred to as bits X and Y with X being the first bus master and Y being the second bus master in the particular stored bit.

The SVP[XY] or saved priority [XY] signal is provided as one input to a two-input AND gate 610. The other input is the RETRY_MSTR signal. The output of the AND gate 610 is provided as one input to a two-input OR gate 612, whose other input is the PCI_RESET signal. The output of the OR gate 612 is provided as one input to an OR gate 614, whose other input is the SNGNT[X] signal. The output of the OR gate 614 is provided to the preset input of a D-type flip-flop 616. The !SVP[XY] signal is provided as one input to a two-input AND gate 618, with the other input receiving the RETRY_MSTR signal. The output of the AND gate 618 is provided as one input to a two-input OR gate 620, whose other input receives the SNGNT[Y] signal. The output of the OR gate 620 is provided to the clear input of the flip-flop 616. It is noted that the preset and clear inputs of the flip-flop 616 are synchronous. The clocking signal to the flip-flop 616 is provided by the output of an OR gate 617 which receives the REARB signal and the outputs of the OR gates 614 and 620 as inputs. The non-inverted output of the flip-flop 616 is the P[XY] or priority XY bit and this is provided to the D input of the flip-flop 616 and to the D input of a D-type flip-flop 622.

The PCI_RESET signal is provided to the preset input of the D-type flip-flop 622. The non-inverting output of the flip-flop 622 is the SVP[XY] signal, while the inverted output provides the !SVP[XY] signal. The flip-flop 622 is clocked by the output of an OR gate 623, whose inputs are the REARB and PCI_RESET signals. The P[XY] signal is also provided as one input to a two-input OR gate 624, with the second input being the LOCKED[X] signal. The output of the OR gate 624 is provided to a two-input AND gate 626, whose second input is the SREQ[X] signal. The output of the AND gate 626 is one input to an OR gate 628, whose output is the MP[XY] or modified priority XY signal. The !P[XY] signal is provided as one input to a two-input AND gate 630, whose other input is the !SREQ[Y] signal. It is noted that the REQ[1] and !REQ[1] signals are utilized in the 1 or EISA channel case, instead of the SREQ[1] and !SREQ[1] signals. The output of the AND gate 630 is the second input to the OR gate 628. The third input to the OR gate 628 is the PARK_CPU signal, in the case of the channels including the CPU and is not utilized in other channels.

In this manner, when a master is retried the saved priority bit is saved in the flip-flop 616, but if not retried, the master loses priority with respect to all masters. Therefore, should a master have to be retried, it retains its priority with regard to all other masters, so it can have priority access to regain the bus upon its next request. However, if it is not being retried, then priority is flipped with respect to its other master. The modified priority decode logic 602, detailed in AND and OR gates 624, 626, 628 and 630, is utilized to allow only requesting masters to enter the arbitration. If for instance, a master has lower absolute priority, i.e. has been used more recently then another master, but that second master is not requesting the bus, the effective priority utilized in the arbitration is flipped, so that the requesting master has priority over all non-requesting masters.

The equations for the grant decode logic 604 are shown below.
CPU_REQ=SREQ0 || PARK_CPU
D_GNT[0]=MP01 && MP02 && MP03 && MP04 && MP05 && MP06 && (!LOCK_REQ_ACTV || LOCKED[0]) && CPU_REQ
D_GNT[1]=MP12 && MP13 && MP14 && MP15 && MP16 && (!MP01 && !LOCK_REQ_ACTV || LOCKED[1]) && REQ[1]
D_GNT[2]=MP23 && MP24 && MP25 && MP26 && (!MP02 && !MP12 && !LOCK_REQ_ACTV || LOCKED[2]) && SREQ[2]
D_GNT[3]=MP34 && MP35 && MP36 && (!MP03 && !MP13 && !MP23 && !LOCK_REQ_ACTV || LOCKED[3]) && SREQ[3]
D_GNT[4]=MP45 && MP46 && (!MP04 && !MP14 && !MP24 && !MP34 && !LOCK_REQ_ACTV || LOCKED[4]) && SREQ[4]
D_GNT[5]=MP56 && (!MP05 && !MP15 && !MP25 && !MP35 && !MP45 && !LOCK_REQ_ACTV || LOCKED[5]) && SREQ[5]
D_GNT[6]=(!MP06 && !MP16 && !MP26 && !MP36 && !MP46 && !MP56 && !LOCK_REQ_ACTV || LOCKED[6]) && SREQ[6]

It can be seen that the particular grant is provided when all of the modified priority bits point to that particular bus master, that bus master has either locked the bus or no lock requests are active and that master is requesting the bus.

The outputs of the grant decoder 604 are the D_GNT [6:0] signals which are provided to the grant storage registers 630 and to the grant off logic 632. The grant off logic 632 also receives the GNT[6:0] signals as well as the PARK_CPU and PCI_IDLE signals. The grant off logic 632 provides the GNT_OFF signal, which is used to guarantee one PCICLK of dead time between grants. The GNT_OFF logic 632 is shown in more detail in FIG. 13.

The GNT_OFF signal is produced as the output of a three-input AND gate 634, two of whose inputs are the SET_GNT and PCI_IDLE signals. The SET_GNT signal is produced as the output of a two-input AND gate 636, one of whose inputs is the NEW_GNT signal and whose other input receives the output of a two-input NAND gate 638. The inputs to the NAND gate 638 are the GNT[1] and REQ[1] signals, indicating that the EISA bus is requesting and has been granted the bus. Thus the SET_GNT signal is provided when a new grant is to occur and the EISA bus has not been the master nor is requesting the bus. The third input to the AND gate 634 is the output of a eight input OR gate 640. The first input to the OR gate 640 is provided by the output of a three-input AND gate 642, which receives at its inputs the GNT[0] signal, the PARK_CPU signal and a signal indicating that the grant is not to bus master 0. The seven other inputs of the OR gate 640 are provided by outputs of AND gates 644 and the like which have as inputs the GNT[x], the !D_GNT[x] and grant not to bus master X signals. Thus the GNT_OFF signal is provided to clear the grant register 630 for one PCICLK signal of bus idle when the bus ownership is changing.

The grant registers 630 are shown in more detail in FIG. 12. The D_GNT[x] signal is provided to the D input of a D-type flip-flop 650. The clear input of the flip-flop 650 receives the output of a two-input OR gate 652, which at its inputs receives the GNT_OFF signal and the CLR_GNT signal. The CLR_GNT signal is provided as the output of a three-input OR gate 654. The inputs to the OR gate 654 are the MNGNT_CLR and GNT16_TO signals and the output of a two-input AND gate 656 which receives the !EREQ and EGNT signals. The EGNT_ signal is provided as the output of a three-input NAND gate 658 whose inputs are the GNT[1], EGNT_EN and !LOCK_ACTV signals. Thus the CLR_GNT signal is used to clear the grant registers 630 when a bus master, other than the EISA bus E, has not taken control within the 16 PCICLK period. The output of the flip-flop 650 is the GNT[x] signal, which is also provided to the D inputs of D-type flip-flops 658 and 660. The non-inverted output of the flip-flop 658 is the SGNT[x] or synchronized grant signal, while the non-inverted output of the flip-flop 660 produces the SNGNT[x] signal because the flip-flop 660 is clocked on the falling edge of the PCICLK signal. Thus the flip-flops 658 and 660 form the synchronized grant register 662 of FIG. 11.

Certain miscellaneous logic and signals have been discussed in this description and the logic is as follows. The PARK_CPU signal is produced by the non-inverting output of a D-type flip-flop 670. The D-input of the flip-flop 670 is connected to the output of a three-input AND gate 672. The inputs to the AND gate 672 are the PCI_IDLE signal, the !REQ_ACTV or inverted request active signal, and the !GNTS_NOCPU signal. The GNTS_NOCPU signal is produced at the output of a six-input OR gate 674 which receives at its inputs the GNT[6:1] signals. Thus the PARK_CPU signal is active when the bus has been idle, no requests are active and there are no grants to masters other than the CPU.

One signal utilized in the new grant state machine 412 was the GNTS_MINTO signal. This signal is produced at the output of a D-type flip-flop 676 (FIG. 12). The clear input to the flip-flop 676 is provided by the output of a two-input OR gate 678, which receives the CLR_GNT and GNT_OFF signals. The D input of the flip-flop 676 is provided by the output of a four-input OR gate 680, whose inputs receive the D_GNT[0,2,3,6] signals. These are the particular bus masters which have minimum grant times.

The REQ_ACTV or request active signal is produced at the output of a seven-input OR gate 682 (FIG. 14) which receives at its inputs the seven REQ signals. Similarly, the REQ_ALL signal is produced as the output of a six-input OR gate 684 which receives at its inputs all of the request signals except for REQ[1] that is the EISA request. The final signal is the REARB signal, which is produced at the non-inverting output of a D-type flip-flop 686 whose D input is connected to the output of a two-input OR gate 688. One input to the OR gate 688 is the GNT16_TO signal, while the second input is connected to the output of a two-input AND gate 690. The FRAME signal and the !SFRAME signal or inverted, synchronized FRAME signal are provided to the AND gate 690. The signal REARB when asserted high indicates that rearbitration for the PCI bus P is to occur.

The above has described the arbitration scheme used by the PCI arbiter 184 to arbitrate requests for the PCI bus P. Requests for the second bus in the system, the EISA bus E, are handled by the central arbitration controller 186. In the preferred embodiment, the requesters for the EISA bus E include the 6 PCI masters, the DMA controller 180 or one of the 16-bit ISA bus masters, the refresh controller 182, and one of five possible EISA bus masters.

As described above, one of the requests for the PCI bus P comes from a master on the EISA bus E. Until the EISA bus E is granted the control of the PCI bus P by the PCI arbiter 184, control of the EISA bus E remains with the PCI arbiter 184. An exception exists for hidden refresh cycles. As noted, the refresh controller 182 does not assert a request to the PCI arbiter 184 when it desires control of the EISA bus E. Thus, the refresh controller 182 is granted control of the EISA bus E when the PCI arbiter 184 has highest priority on the EISA bus E. While the refresh controller 182 has control of the EISA bus E, the PCI arbiter P continues to grant access to the PCI bus P to PCI bus masters. When the PCI bus P is granted to a requesting master (other than the refresh controller 182) on the EISA bus E, that is, the signal EGNT_ is asserted, then the central arbitration controller 186 grants control of the EISA bus E to the bus master on the EISA bus having highest priority.

A request by one of the PCI masters is indicated by the assertion of the signal REQ_ALL, which is asserted high if any one of the signals REQ[6:2,0] is asserted high. A request by the refresh controller 182 is indicated by the assertion of a signal REFREQ, a request by the EISA bus masters is indicated by one of the signals MRQ_[4:0] being asserted, a request by the DMA controller 180 or one of the 16-bit ISA bus masters is indicated by the assertion of a signal DMAREQ. The possible requests for the EISA bus E are all handled by the central arbitration controller 186. The central arbitration controller 186 generally implements a five-way rotating priority scheme, with slot 1 assigned to the PCI masters (including the CPU-PCI bridge 210) and the refresh controller 182, slot 2 assigned to the DMA controller or ISA bus masters, slot 3 again assigned to the PCI masters or the refresh controller 182, slot 4 assigned to the EISA bus masters and slot 5 assigned again to the DMA controller 180 or the ISA bus masters. The PCI masters and the DMA controller 180 and ISA bus masters were each given two slots in the rotation scheme because these devices are not able to tolerate much latency once their request is asserted.

Once one of the PCI slots is provided ownership of the PCI bus P, all pending PCI requests are serviced until the EISA bus E attains highest priority in the modified LRU scheme implemented in the PCI arbiter 184. When that occurs, the central arbitration controller 186 determines the next winner of the EISA bus E.

As noted, the relative priority of the requesters is determined by a rotating priority scheme between five requestor types. The priority of the various possible requesters is modified when a non-maskable interrupt or NMI is detected active and a PCI master is requesting the EISA bus E. In that case, requests from the DMA controller 180, the ISA bus masters, and the EISA bus masters are masked or bypassed in the current arbitration cycle. This allows the CPU 100 more time to process the NMI and reduces interrupt latency. When none of the request signals are asserted, control of the EISA bus E defaults to one of the PCI masters to shorten the CPU access to the EISA bus E when needed. As noted above with respect to the PCI arbiter 184, the CPU 100 is parked on the PCI bus P when none of the other PCI bus masters are requesting the bus. Thus, on a cache miss, in non-cacheable cycles, or in I/O cycles, CPU access to the EISA bus E is sped up.

Once the first level of prioritization described above is performed, a second level of prioritization is performed if either the DMA controller 180 or one of the ISA bus masters gains control or one of the EISA bus masters gains control of the EISA bus E. If the EISA bus masters are granted control of the EISA bus E, then a second level five-way rotating priority scheme is performed to determine the priority between the EISA bus masters. If the DMA controller 180 or ISA bus masters wins control of the EISA bus E, then either a fixed or rotating priority scheme is performed in the DMA controller 180 to determine which of the seven channels in the DMA controller 180 gains access to the EISA bus E. The priority scheme between channels in a DMA controller 180 is well known to those skilled in the art.

The DMA controller 180 requests the EISA bus E in one of two conditions. It may request control for running DMA cycles, and it may also request control of the EISA bus E if an ISA bus master needs control of the bus. The ISA bus master can request control of the EISA bus E through the DMA channel by programming the DMA channel assigned to the 16-bit ISA device in cascade mode. A granted request by the ISA bus master will cause the DMA controller 180 to disable its outputs (except a request and acknowledge signals to the ISA bus master) to enable the ISA bus master to gain control of the EISA bus E. For more information on 8237-compatible DMA controllers, refer to Peripheral Components, Intel Corp., pgs. 5-4 to 5-21 (1994), which is hereby incorporated by reference.

For compatibility reasons, if a channel of the DMA controller 180 is programmed in cascade mode or in ISA compatible timing, the DMA controller 180 cannot be pre-empted off the EISA bus E once it obtains ownership. However, if a particular channel is not programmed to cascade mode or for compatible timing, then the channel can be preempted, causing the DMA controller 180 to relinquish control of the EISA bus E if another request for the bus is asserted. Once another active request is detected, the DMA controller 180 has 32 BCLK periods or approximately four microseconds to get off the EISA bus E. A timeout counter is used to indicate when the 32 BCLK periods has expired.

Arbitration between all the possible requestors of the EISA bus E is performed in each BCLK cycle. Thus, on each rising edge of the signal BCLK, all the request lines are sampled and the arbitration logic prioritizes each of the requests and determines which device will be granted control of the EISA bus E at the end of the current BCLK period.

If the current owner of the EISA bus E has not relinquished the bus by the end of the BCLK period, control of the EISA bus E is not transferred to the new winner. Instead, all the requests are resampled on the next rising edge of the clock BCLK. Thus, it is possible that the rearbitration may produce a new winner as new request lines may have been asserted. This continues in each BCLK period until the EISA bus E has been relinquished by the current owner, at which time control of the EISA bus E is transferred to the requestor which has the highest priority as determined in the prior arbitration cycle. As the arbitration has been completed before the present owner has given up control of the EISA bus E, transfer of control of the EISA bus E can be immediately given to the next device. Thus, as a result of the pipelining of the ownership arbitration, no time is lost for arbitration for the EISA bus E.

Figure 15:
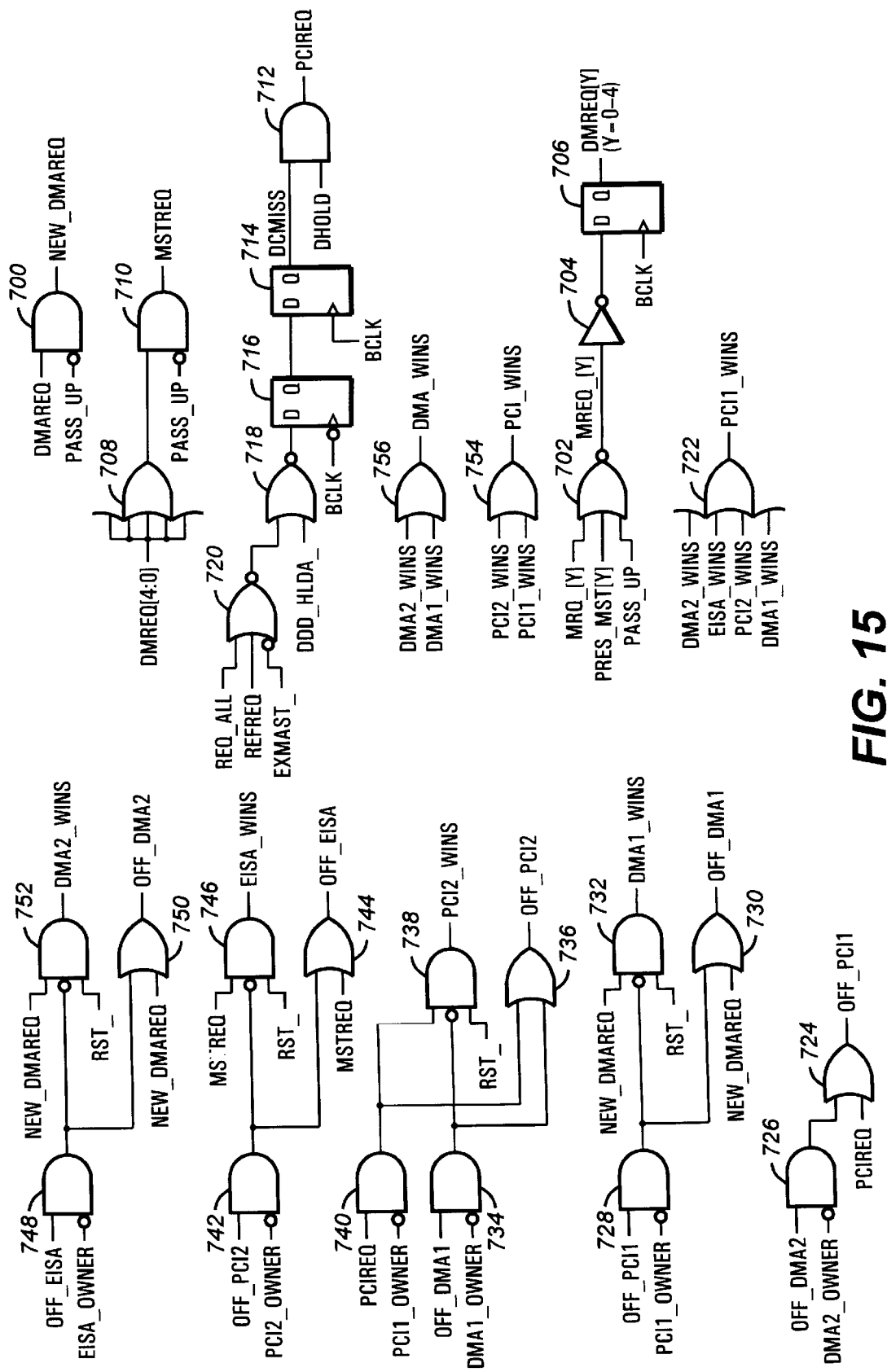
FIGS. 15, 16A and 16B are a schematic diagram of circuitry in the central arbitration controller of FIG. 1 for performing a first level rotating priority scheme.

Referring now to FIG. 15, portions of the central arbitration controller 186 are shown which perform the first level five-way rotating priority scheme. The DMA controller 180 requests the EISA bus E by asserting the signal DMAREQ, which is provided to one input of a two-input AND gate 700. The other input of the AND gate 700 receives the inverted state of a signal PASS_UP, which is asserted high if an NMI is detected and a PCI master is requesting the EISA bus E. Thus, in response to an NMI, the signal PASS_UP masks the DMA request DMAREQ in the current arbitration cycle. The output of the AND gate 700 provides a signal NEW_DMAREQ.

The EISA bus masters request the EISA bus E by asserting the appropriate one of the signals MRQ_[4:0]. The signal MRQ_[Y], Y equals 0–4, is provided to one input of a three-input OR gate 702, whose other inputs receive a signal PRES_MST[Y] and the signal PASS_UP. The signal PRES_MST[Y] indicates which EISA bus master is currently the owner of the EISA bus E. The output of the OR gate 702 provides a signal MREQ_[Y], which is connected to the input of an inverter 704. The output of the inverter 704 is connected to the D input of a D-type flip-flop 706, which is clocked on the rising edge of the EISA bus clock BCLK. The non-inverting output of the flip-flop 706 drives a signal DMREQ[Y]. It is noted that this instance of the logic gates comprising the OR gate 702, the inverter 704, and the flip-flop 706 are repeated once for each of the EISA bus masters for a total of five such circuits. Thus, it is seen that the signal DMREQ[Y] is not asserted if the bypass signal PASS_UP is asserted or if the EISA bus master asserting the request signal MRQ_[Y] is presently the master of the EISA bus E.

The signals DMREQ[4:0] are provided to the inputs of a five-input OR gate 708, whose output is connected to one input of a two-input AND gate 710. The other input of the AND gate 710 receives the inverted state of the signal PASS_UP, and the output provides a signal MSTREQ to indicate a request from one of the EISA bus masters.

A request from a PCI bus master or from the refresh controller 182 is indicated by the assertion of a signal DCMISS, which is provided by a D-type flip-flop 714. The flip-flop 714 is clocked on the rising edge of the signal BCLK, and its D input is connected to the output of a D-type flip-flop 716. The flip-flop 716 is clocked on the falling edge of the signal BCLK, and its D input is connected to the output of a two-input NOR gate 718. The first input of the NOR gate 718 receives a signal DDD_HLDA_, and the second input is connected to the output of a three-input NOR gate 720. The inputs of the NOR gate 720 receive the signals REQ_ALL and REFREQ and the inverted state of a signal EXMAST_. The signal EXMAST_ when asserted low indicates that an EISA bus master is currently the owner of the bus. The signal DDD_HLDA_ is a delayed version of the acknowledge signal DHLDA for indicating the granting of the EISA bus E to one of the EISA bus masters, the DMA controller 180, or one of the 16-bit ISA bus masters. Thus, the signal DCMISS is enabled only if one of the EISA bus masters, the DMA controller 182, or ISA bus masters is currently the owner of the EISA bus E. The inverted state of the signal EXMAST_ is provided to one input of the NOR gate 720 to force assertion of the PCIREQ signal once an EISA bus master is granted control of the EISA bus E. As will be explained below with FIG. 18, assertion of a active request once an EISA bus master gains bus ownership forces the EISA bus master to relinquish control of the EISA bus E within 64 BCLK periods. This reduces the overall latency of the arbitration for the EISA bus E.

The signals PCI1_WINS and PCI2_WINS indicate that the first and second PCI requests, respectively, are the winner in the current arbitration cycle. The signals DMA1_WINS and DMA2_WINS indicate that the first and second DMA requests, respectively, are the winners of the current arbitration cycle. The signal EISA_WINS indicates that one of the EISA bus masters is currently the winner in the arbitration cycle. The signal PCI1_WINS is provided by a four-input gate 722, whose inputs receive the signals DMA2_WINS, DMA1_WINS, PCI2_WINS, and EISA_WINS. Thus, assertion of the signal PCI1_WINS indicates that none of the other requests is the winner. A signal OFF_PCI1 is provided by an OR gate 724, whose first input receives the signal PCIREQ, and whose second input is connected to the output of an AND gate 726. The inputs of the AND gate 726 receive a signal OFF_DMA2 and the inverted state of a signal DMA2_OWNER. The signal OFF_PCI1 when asserted disables the lower priority signals DMA1_WINS, PCI2_WINS, EISA_WINS and DMA2_WINS. The signal DMA2_OWNER indicates that the second DMA request was the winner in the previous arbitration cycle.

The signal OFF_PCI1 is provided to one input of an AND gate 728, whose other input receives the inverted state of a signal PCI1_OWNER indicating that the first PCI request won in the previous arbitration cycle. The output of the AND gate 728 is connected to one input of an OR gate 730 and to an inverted input of an AND gate 732. The other inputs of the AND gate 732 receive the signals NEW_DMAREQ and RST_. The signal RST_ is the inverted state of the PCI reset signal PCI_RESET. The other input of the OR gate 730 receives the signal NEW_DMAREQ. The outputs of the OR gate 730 and the AND gate 732 provide signals OFF_DMA1 and DMA1_WINS, respectively.

The signal OFF_DMA1 is provided to one input of an AND gate 734, whose other input receives the inverted state of a signal DMA1_OWNER, which indicates that the first DMA request won in the previous arbitration cycle. The output of the AND gate 734 is provided to one input of an OR gate 736, and to an inverted input of an AND gate 738. The other input of the OR gate 736 is connected to the output of an AND gate 740, whose inputs receive the signal PCIREQ and the inverted state of the signal PCI1_OWNER. The output of the AND gate 740 is also connected to one input of the AND gate 738, whose remaining input receives the signal RST_. The outputs of the AND gate 738 and the OR gate 736 provide signals PCI2_WINS and OFF_PCI2, respectively. The signal PCI1_OWNER is gated to the AND gate 740 to prevent the second PCI request from winning in the current arbitration cycle if a PCI request had won in the prior arbitration cycle.

The signal OFF_PCI2 is provided to one input of an AND gate 742, whose other input receives the inverted state of a signal PCI2_OWNER, which indicates that the second PCI request won in the previous arbitration cycle. The output of the AND gate 742 is connected to one input of an OR gate 744 and to an inverted input of an AND gate 746. The other inputs of the AND gate 746 receive signals MSTREQ and RST_, while the other input of the OR gate 744 receives the signal MSTREQ. The outputs of the AND gate 746 and the OR gate 744 provide signals EISA_WINS and OFF_EISA, respectively.

The signal OFF_EISA is provided to one input of an AND gate 748, whose other input receives the inverted state of a signal EISA_OWNER, which indicates that an EISA bus master won in the previous arbitration cycle. The output of the AND gate 748 is connected to one input of an OR gate 750 and to an inverted input of a AND gate 752. The other inputs of the AND gate 752 receive the signals NEW_DMAREQ and RST_, while the other input of the OR gate 750 receives the signal NEW_DMAREQ. The outputs of the AND gate 752 and the OR gate 750 provide signals DMA2_WINS and OFF_DMA2, respectively.

The signals PCI1_WINS and PCI2_WINS are provided to the inputs of a two-input OR gate 754, which provides an output signal PCI_WINS to indicate that a PCI request has won in the current arbitration cycle. Similarly, the signals DMA1_WINS and DMA2_WINS are provided to the inputs of a two-input OR gate 756, which provides a signal DMA_WINS to indicate that a DMA request has won in the current arbitration cycle. The logic above describes a rotating scheme of priority for the various requests for the EISA bus E, with the first PCI request initially having the highest request, followed by the first DMA request, the second PCI request, the EISA bus master request, and finally the second DMA request. If no requests for the EISA bus E is pending, then the signal PCI1_WINS is asserted by default. This assists in reducing the latency for PCI accesses of the EISA bus E. The five-way rotating priority scheme is disturbed only when an NMI or non-maskable interrupt is received while the signal DCMISS is asserted to indicate a PCI request. In that case, the signal PASS_UP is asserted to mask or by-pass the DMA request signal DMAREQ and the EISA bus master request signals DMREQ[4:0].

Figure 16A:
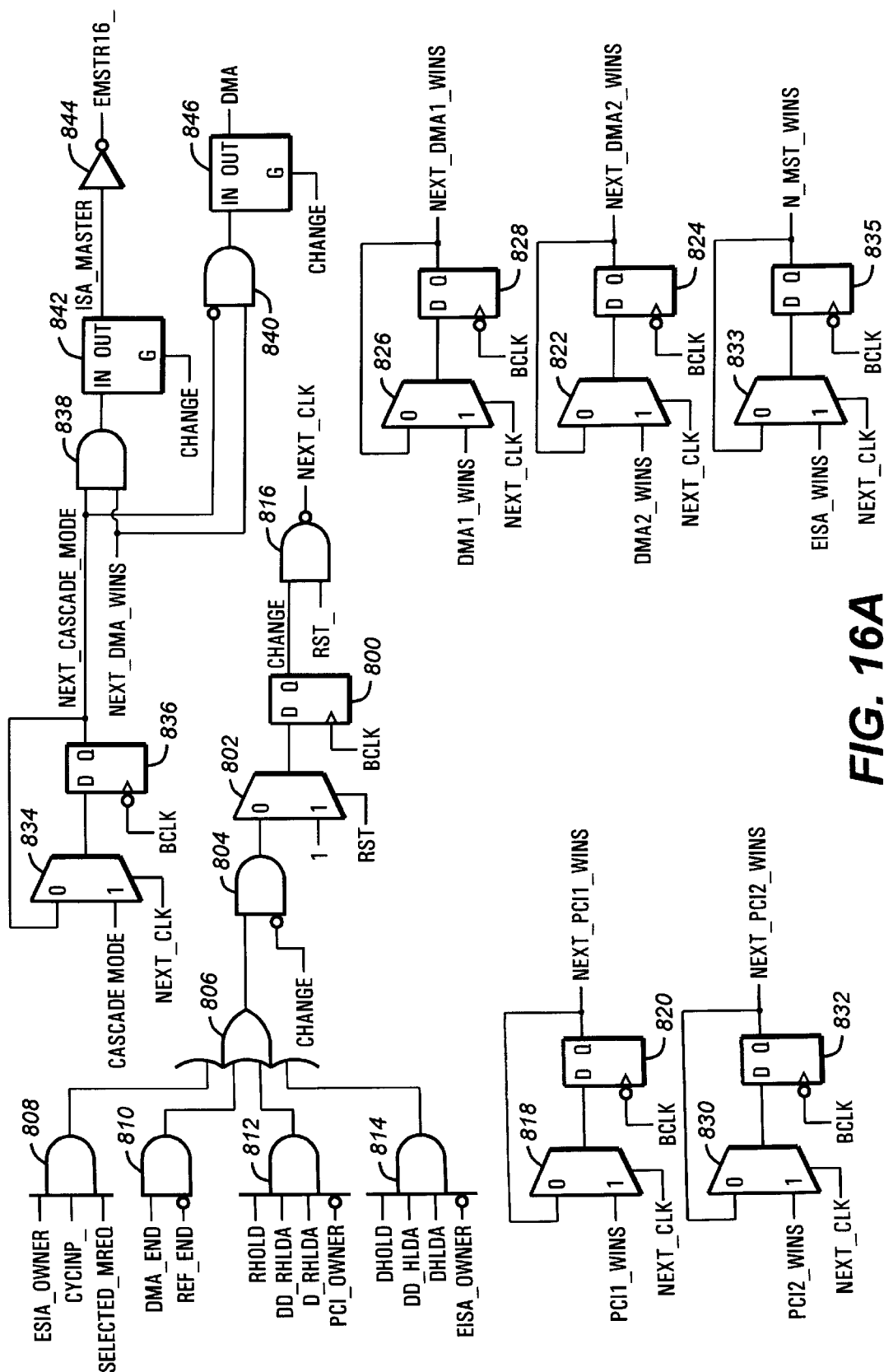
Figure 16B:
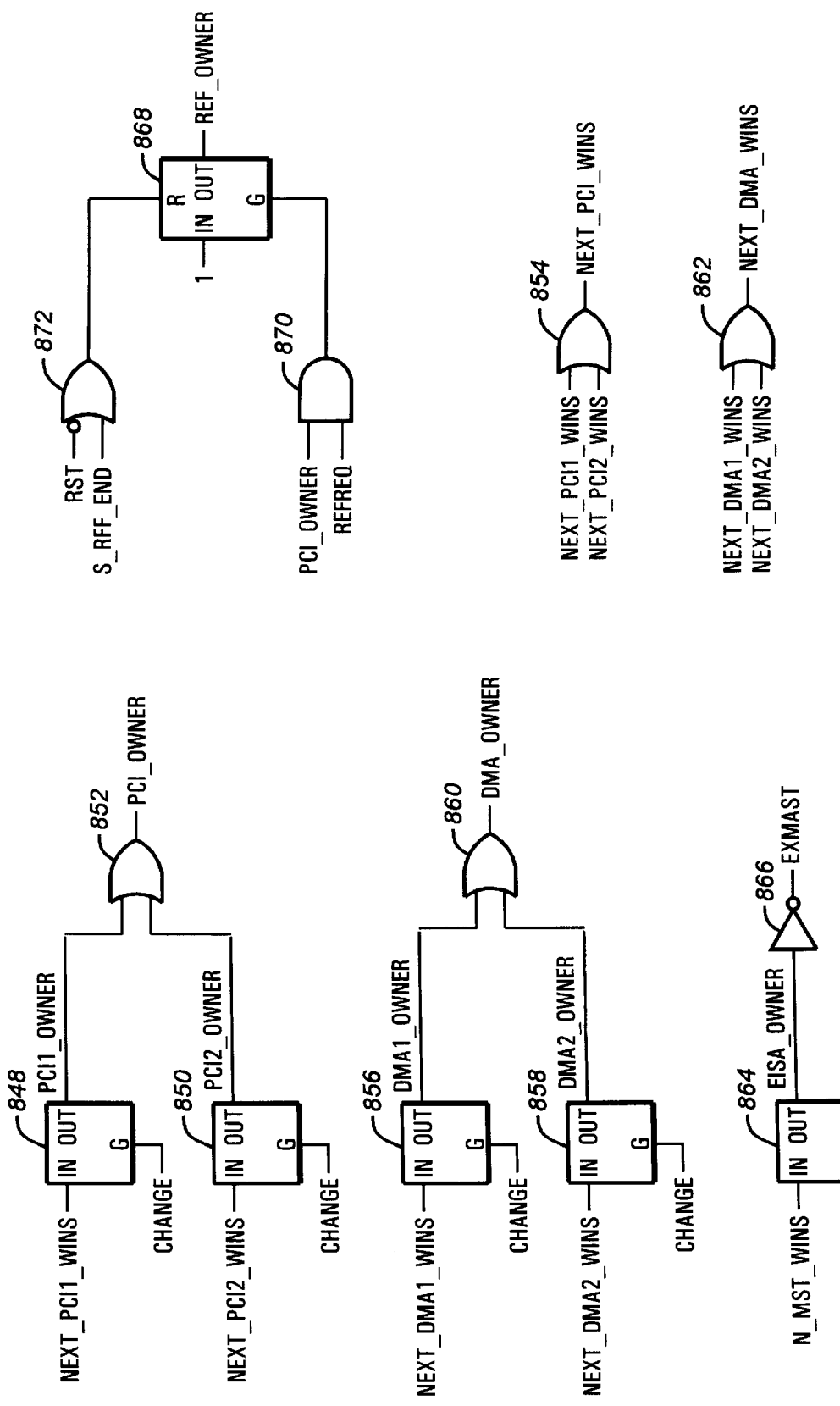

Referring now to FIGS. 16A and 16B, additional logic in the central arbitration controller 186 is shown. A signal CHANGE indicates when a transfer of EISA bus ownership is to occur. The signal CHANGE is provided by a D-type flip-flop 800, which is clocked on the rising edge of the signal BCLK and whose D input is connected to the output of a 2-to-1 multiplexor 802. The 1 input of the multiplexor 802 is tied high and the 0 input is connected to the output of an AND gate 804. The select input of the multiplexor 802 receives the inverted state of the PCI reset signal RST_. One input of the AND gate 804 is connected to the output of a four-input OR gate 806, and the other input of the AND gate 804 is connected to the inverted state of the signal CHANGE. The inputs of the OR gate 806 are connected to the outputs of AND gates 808, 810, 812 and 814. The inputs of the AND gate 808 receive the signal EISA_OWNER, a signal CYCINP_ which when asserted low indicates a cycle in progress on the EISA bus E, and a signal SELECTED_MREQ_ which when driven low indicates that the EISA bus master that was the previous owner of the EISA bus E is maintaining its request line MRQ_ asserted low. Thus, if the EISA bus master having ownership of the EISA bus E deasserts its MRQ_ signal, causing the signal SELECTED_MREQ_ to be deasserted high, and a cycle is not in progress on the EISA bus E, then the signal CHANGE will be asserted high to change ownership of the EISA bus E.

The inputs of the AND gate 810 receive a signal DMA_END indicating the end of a DMA cycle and the inverted state of a signal REF_END indicating the end of a refresh cycle. Thus, the end of a DMA cycle will cause the signal CHANGE to be asserted if the signal REF_END is deasserted. The signal DMA_END is also asserted high at the end of a refresh cycle. Therefore, the inverted state of REF_END is gated to the AND gate 810 to ensure that the signal CHANGE is asserted only at the end of a DMA cycle and not at the end of a refresh cycle.

The inputs of the AND gate 812 receive signals RHOLD, DD_RHLDA_, D_RHLDA and the inverted state of the signal PCI_OWNER. The signal RHOLD is asserted in response to a refresh request and the signals D_RHLDA and DD_RHLDA_ are delayed versions of the refresh acknowledge signal RHLDA to acknowledge the granting of the RHOLD request. The signal D_RHLDA is the signal RHLDA latched on the falling edge of the signal BCLK. The signal DD_RHLDA_ is the version of the inverted state of the signal D_RHLDA latched on the rising edge of the signal BCLK. Thus, if a PCI master or the refresh controller 182 is not the owner of the EISA bus E in the previous arbitration cycle, and a refresh request has been acknowledged, then the signal CHANGE is asserted high. Once the refresh controller 182 is determined to be the owner, then the ownership is maintained and does not change until the end of the refresh cycle. It is noted here that while the hidden refresh cycle is in progress, the PCI arbiter 184 still has control of the PCI bus P. In other words, PCI bus masters can still run PCI cycles on the PCI bus while the hidden refresh cycle is running on the EISA bus E.

The AND gate 814 receives signals DHOLD, DD_HLDA_, and DHLDA and the inverted state of the signal EISA_OWNER. The signal DD_HLDA_ is the version of the inverted state of the signal DHLDA latched on the rising edge of the signal BCLK. Thus, if an EISA master is not the winner of the EISA bus E in the previous arbitration cycle, and a request from the DMA controller 180, one of the 16-bit ISA bus masters, or one of the EISA bus masters has been acknowledged, then the signal CHANGE is asserted high.

The signal CHANGE is provided to one input of a two-input NAND gate 816, whose other input receives the signal RST_. The output of the NAND gate 816 drives a signal NEXT_CLK, which is provided to the select inputs of various multiplexors to determine the next owner of the EISA bus E, as will be explained below. The signal NEXT_CLK is normally high, as the signal CHANGE is normally low. The signal NEXT_CLK is provided to the select inputs of 2-to-1 multiplexors 818, 822, 826, 830, 833 and 834. The 1 input of the multiplexor 818 receives the signal PCI1_WINS, and its output is connected to the D input of a D-type flip-flop 820 which is clocked on the falling edge of the signal BCLK. The output of the D flip-flop 820 provides a signal NEXT_PCI1_WINS, which is fed back to the 0 input of the multiplexor 818. As the signal NEXT_CLK is normally high, the state of the signal NEXT_PCI1_WINS is normally driven by the signal PCI1_WINS. When the signal CHANGE is asserted high, the signal NEXT_CLK is deasserted low to latch the state of the signal NEXT_PCI1_WINS.

Similarly, the 1 input of the multiplexor 830 receives the signal PCI2_WINS and its output drives the D input of a D-type flip-flop 832. The output of the flip-flop 832 provides a signal NEXT_PCI2_WINS, which is fed back to the 0 input of the multiplexor 830. The 1 input of the multiplexor 826 receives the signal DMA1_WINS, and its output drives the D input of a D-type flip-flop 828. The output of the flip-flop 828 provides the signal NEXT_DMA1_WINS, which is fed back to the 0 input of the multiplexor 826. The 1 input of the multiplexor 822 receives the signal DMA2_WINS, and its output is connected to the D input of a D-type flip-flop 824. The output of the flip-flop 824 provides the signal NEXT_DMA2_WINS, which is fed back to the 0 input of the multiplexor 822. The signal EISA_WINS is provided to the 1 input of the multiplexor 833, whose output is provided to the D input of a D-type flip-flop 835. The output of the flip-flop 835 provides a signal N_MST_WINS, which is fed back to the 0 input of the multiplexor 833. All four flip-flops 824, 828, 832 and 833 are clocked on the falling edge of the signal BCLK.

As noted above, the DMA controller 180 has seven channels, each of which can individually be programmed to cascade mode for connection to a 16-bit ISA bus master. When programmed to cascade mode, the 16-bit ISA bus master can go through the DMA controller 180 to request access to the EISA bus E. Whether a selected channel is programmed to cascade mode is indicated by a signal CASCADE_MODE, which is provided to the 1 input of the multiplexor 834. The output of the multiplexor 834 is connected to the D input of a D-type flip-flop 836, which is clocked on the falling edge of the signal BCLK. The output of the flip-flop 836 provides a signal NEXT_CASCADE_MODE, which is fed back to the 0 input of the multiplexor 834. The signal NEXT_CASCADE_MODE is connected to one input of a two-input AND gate 838 and an inverted input of a two-input AND gate 840. The other inputs of the AND gates 838 and 840 receive the signal NEXT_DMA_WINS. The output of the AND gate 838 drives the data input of a latch 842, whose output is connected to the input of an inverter 844. The gate input of the latch 842 receives the signal CHANGE, which when asserted high allows the state at the input of the latch to flow to the output of the latch. The output of the inverter 844 drives a signal EMSTR16_, which when asserted low indicates that a 16-bit ISA bus master has ownership of the EISA bus E.

The output of the AND gate 840 is connected to the data input of a latch 846, whose output drives a signal DMA and whose gate input receives the signal CHANGE. When asserted high, the signal DMA indicates that the DMA controller 180 has ownership of the EISA bus E.

The signal NEXT_PCI1_WINS is provided to the data input of a latch 848, whose output drives a signal PCI1_OWNER. The gate input of the latch 848 receives the signal CHANGE. The signal NEXT_PCI2_WINS is provided to the data input of a latch 850, whose output drives the signal PCI2_OWNER. The gate input of the latch 850 receives the signal CHANGE. The signals PCI1_OWNER and PCI2_OWNER are provided to the inputs of a two-input OR gate 852, whose output drives the signal PCI_OWNER indicating when asserted high that a PCI master or the refresh controller 182 has ownership of the EISA bus E. The signals NEXT_PCI1_WINS and NEXT_PCI2_WINS are also provided to the inputs of a two-input OR gate 854, whose output drives a signal NEXT_PCI_WINS.

In a similar fashion, the signals NEXT_DMA1_WINS and NEXT DMA2_WINS are provided to the data inputs of latches 856 and 858, respectively, whose outputs drive signals DMA1_OWNER and DMA2_OWNER. The gate inputs of the latches 856 and 858 both receive the signal CHANGE. The signals DMA1_OWNER and DMA2_

OWNER are provided to the inputs of a two-input OR gate 860, whose output drives a signal DMA_OWNER. The signals NEXT_DMA1_WINS and NEXT_DMA2_WINS are also provided to the inputs of a two-input OR gate 862, whose output drives a signal NEXT_DMA_WINS.

If the next owner of the EISA bus E is an EISA bus master, then the signal N_MST_WINS is asserted high. The signal N_MST_WINS is provided to the data input of a latch 864, whose output provides a signal EISA_OWNER. The gate input of the latch 864 receives the signal CHANGE. The signal EISA_OWNER is connected to the input of an inverter 866, whose output drives the signal EXMAST_ for indicating when an EISA bus master is the owner of the EISA bus E.

As discussed above, the refresh controller 182 gains access to the EISA bus E in one of the PCI slots in the five-way rotating priority scheme. If the refresh controller 182 is the winner of the arbitration cycle, then a signal REF_OWNER is asserted high, which is provided by the output of a latch 868. The gate input of the latch 868 is connected to the output of an AND gate 870, which receives the signal PCI_OWNER and the refresh request signal REFREQ. The data input of the latch 868 is tied high. If both signals REFREQ and PCI_OWNER are asserted high, then the signal REF_OWNER is set high. The reset input of the latch 868 is connected to the output of an OR gate 872, which receives a signal S_REF_END and the inverted state of the signal RST_. The signal S_REF_END indicates the end of a refresh cycle. When the signal S_REF_END is asserted high, the signal REF_OWNER is reset low.

As will be described below with respect to FIG. 17, the signal RHLDA is maintained deasserted if a PCI-to-EISA cycle is posted or in progress. Effectively, this prevents a hidden refresh cycle from executing on the EISA bus E if a PCI-to-EISA cycle has been posted or is in progress.

Figure 17:
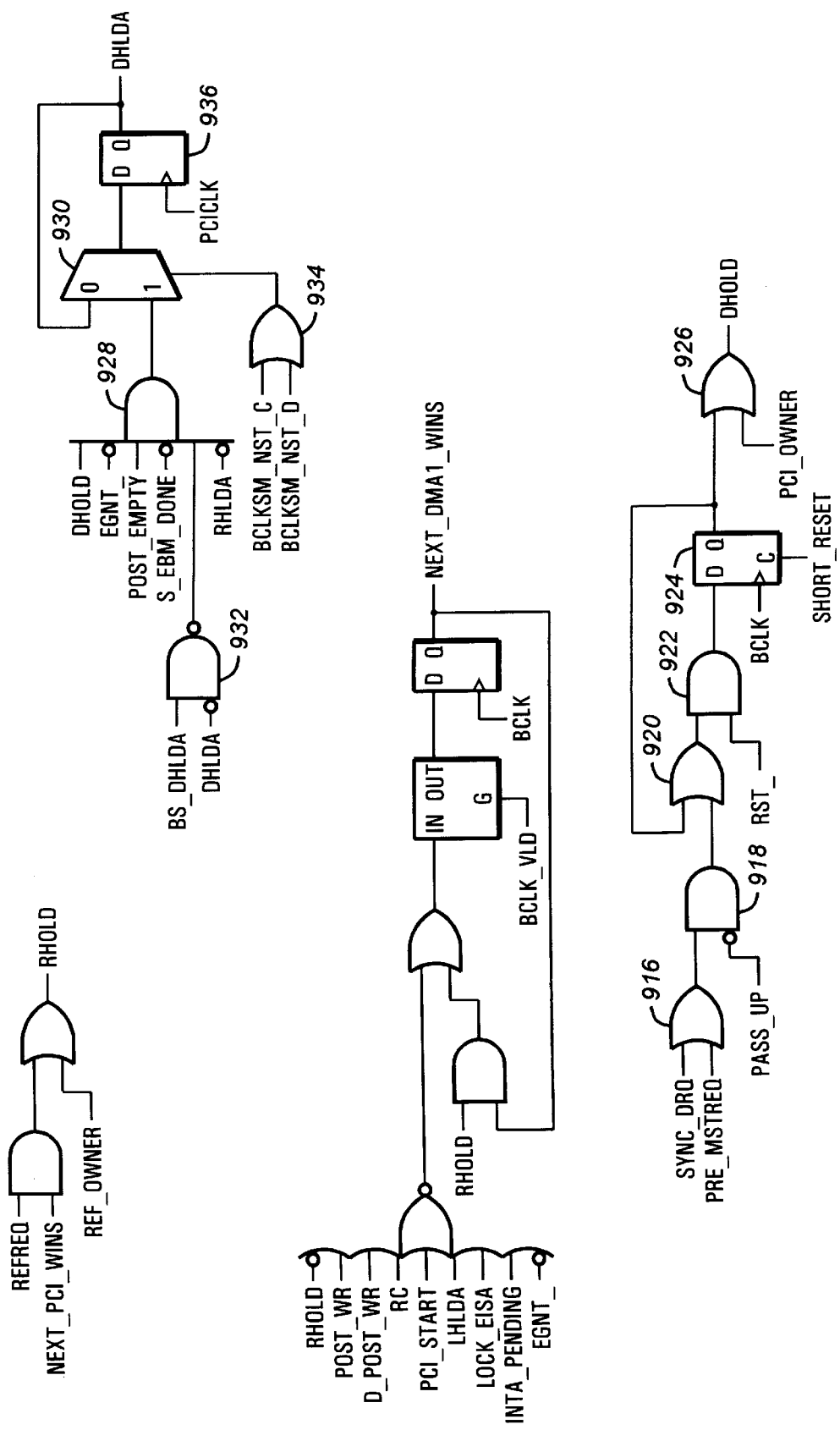
FIG. 17 is a schematic diagram of logic for generating various request and acknowledge signals.

Referring now to FIG. 17, logic in the central arbitration controller 186 for providing signals DHOLD, DHLDA, RHOLD, and RHLDA is described. The signals REFREQ and NEXT_PCI_WINS are provided to the inputs of a two-input AND gate 902, whose output is connected to one input of an OR gate 904. The other input of the OR gate 904 receives the signal REF_OWNER, and the output of the OR gate 904 drives the signal RHOLD. Thus, if one of the two PCI slots has the highest priority in the current arbitration cycle, and the refresh request signal REFREQ is asserted high, then the signal RHOLD is driven high. The signal REF_OWNER is driven to the other input of the OR gate 904 to maintain the signal RHOLD asserted high once the refresh controller 182 is granted ownership. The signal RHOLD is provided to an inverted input of a nine-input NOR gate 906. The other inputs of the NOR gate 906 receive the following signals, any one of which when asserted would disable assertion of the signal RHLDA: a signal POST_WR indicating a PCI-to-EISA write cycle has been posted; a signal D_POST_WR which is the signal POST_WR synchronized to the negative edge of the PCI clock PCICLK; a signal RC indicating that a PCI-to-EISA cycle is running; a signal PCI_START indicating that a PCI-to-EISA cycle is starting on the EISA bus E; a signal LHLDA which is asserted high when both signals DHOLD and DHLDA are asserted indicating that the EISA bus E has been granted to the DMA controller 180, one of the 16-bit ISA bus masters or one of the EISA masters; a signal LOCK_EISA indicating that the PCI-EISA bridge 130 is locked as a PCI slave; a signal INTA_PENDING indicating that an interrupt cycle is pending; and the inverted state of the EISA grant signal EGNT_ which when asserted indicates that the PCI bus P has been granted to one of the masters on the EISA bus E, including the DMA controller 180, the 16-bit ISA masters, or the EISA bus masters. The signal RHLDA is qualified with the signal EGNT_ to allow the write buffers in the PCI-EISA bridge 130 to flush before a refresh cycle is allowed to begin. The output of the NOR gate 906 is connected to one input of a two-input OR gate 908, whose other input is connected to the output of a two-input AND gate 910. The inputs of the AND gate 910 receive signals RHOLD and RHLDA. The output of the OR gate 908 is connected to the data input of a latch 912, whose output is connected to the D input of a D-type flip-flop 914. The gate input of the latch 912 receives a signal BCLK_VLD, which is asserted high on the falling edge of the signal PCICLK if the signal BCLK is either asserted high or falling low. The flip-flop 914 is clocked on the rising edge of the signal BCLK, and its output drives the signal RHLDA. The signal RHLDA causes an acknowledge signal to be provided to the refresh controller 182, which responds to its assertion by taking control of the EISA bus E and running a refresh cycle. The refresh controller 182 maintains control of the EISA bus E until the refresh cycle is completed. In the preferred embodiment, the refresh controller 182 requires the use of the EISA bus E to run a refresh cycle approximately once every 15 microseconds.

As indicated above, if a PCI-to-EISA cycle is posted or in progress, the signal RHLDA is maintained negated. This prevents the refresh controller 182 from obtaining control of the EISA bus E, effectively giving priority to the PCI request for the EISA bus E.

A request from the DMA controller 180 or from one of the 16-bit ISA bus masters is indicated by a signal SYNC_DRQ, and a request from one of the EISA bus masters is indicated by a signal PRE_MSTREQ. Both signals are provided to the inputs of an OR gate 916, whose output is connected to one input of a two-input AND gate 918. The other input of the AND gate 918 is connected to the inverted state of the signal PASS_UP which indicates if an NMI is asserted while a request is pending from a PCI master. The output of the AND gate 918 is connected to one input of a two-input OR gate 920, whose output is in turn connected to one input of a AND gate 922. The other input of the AND gate 922 receives the signal RST_, and its output is connected to the D input of a D-type flip-flop 924. The flip-flop 924 is clocked on the rising edge of the signal BCLK and its clear input receives a signal SHORT_RESET. The signal SHORT_RESET is asserted high if the system reset signal RST_ is asserted low, or if a signal CHANGE_SHORT is asserted high, which is a version of the signal CHANGE asserted for half a BCLK period. The output of the flip-flop 924 drives a signal NON_PCI_REQ, which is routed back to one input of the OR gate 920 and which is also connected to one input of a two-input OR gate 926. The signal NON_PCI_REQ indicates a request from the DMA controller 180, a 16-bit ISA bus master, or an EISA bus master. The other input of the OR gate 926 receives the inverted state of the signal PCI_OWNER, and its output drives the signal DHOLD. Thus, if the signal PCI_OWNER is deasserted low, or a request has been asserted from one of the DMA controller 180, ISA bus masters or EISA bus masters, then the signal DHOLD is asserted high.

The signal DHOLD is provided to one input of a six-input AND gate 928. The AND gate 928 also receives the inverted state of the signal EGNT_ to indicate if the PCI bus P has been granted to a master on the EISA bus E; a signal POST_EMPTY which is asserted high if a PCI cycle is not in progress or has not just started; the inverted state of a signal S_EBM_DONE which is asserted high if the PCI master logic in the PCI-EISA bridge 130 is performing a posted write cycle on the PCI bus P; and the inverted state of the signal RHLDA indicating that the EISA bus E has not been granted to the refresh controller 182. The final input of the AND gate 928 is connected to the output of a NAND gate 932, whose inputs receive a signal BS_DHLDA and the inverted state of the signal DHLDA. The signal BS_DHLDA is the signal DHLDA delayed by one positive edge of the clock BCLK. The NAND gate 932 insures that after the signal DHLDA has been deasserted, the signal DHLDA cannot be reasserted again until after two BCLK periods to allow time for the signal EGNT_ to negate. The output of the AND gate 928 is connected to the 1 input of a 2:1 multiplexor 930, whose select input is connected to the output of an OR gate 934. The inputs of the OR gate 934 receive signals BCLKSM_NST_C and BCLKSM_NST_D, which when asserted indicate that the BCLK signal is falling low or is already low, respectively. The output of the multiplexor 930 is connected to the D input of a D-type flip-flop 936, which is clocked on the rising edge of the PCI clock PCICLK. The output of the flip-flop 936 provides the signal DHLDA, which is fed back to the 0 input of the multiplexor 930. Thus, the signal DHLDA is enabled only if the PCI bus P has been granted to the EISA bus E, a PCI cycle is not in progress or has not just started, the PCI master logic is not performing a posted write cycle, and the refresh acknowledge signal RHLDA is deasserted low.

When the signal DHOLD is asserted high, the PCI-EISA bridge 130 asserts a flush request signal FLUSHREQ_ to the CPU-PCI bridge 210 if the signal FLUSHREQ_ is not already asserted by another PCI bus master. The signal FLUSHREQ_ forces the PCI-EISA bridge 210 to flush its write posting buffers, thereby preventing the CPU 200 from posting writes to the EISA bus E. Continued assertion of the signal FLUSHREQ_ ensures that the CPU write cycles are not posted. The flush request signal FLUSHREQ_ is deasserted when the EISA cycle is completed and the acknowledge signal DHLDA has negated.

Figure 18:
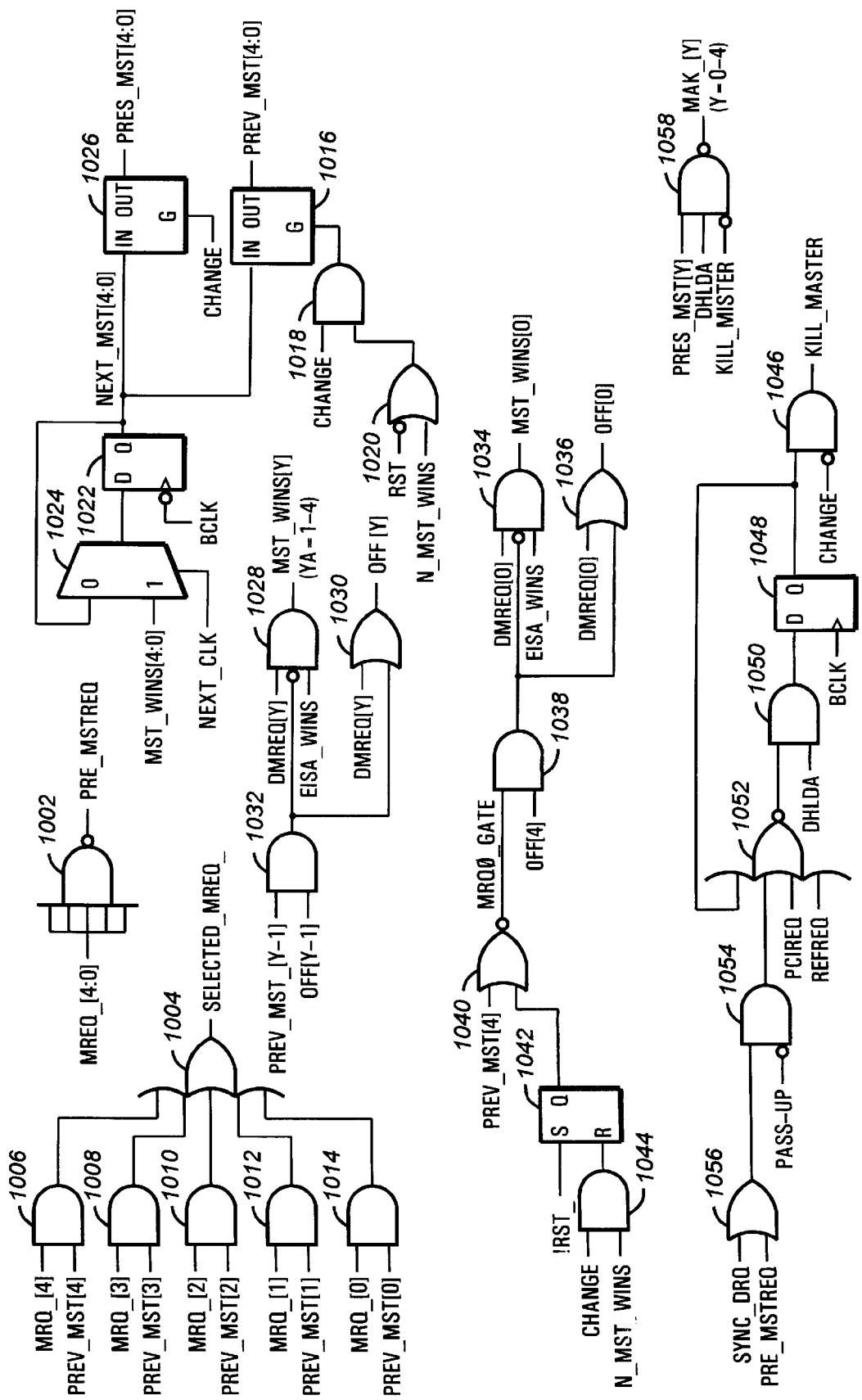
FIG. 18 is a schematic diagram of circuitry in the central arbitration controller for performing a second level rotating priority scheme.

Referring now to FIG. 18, logic for generating the EISA bus master request signals and for performing the second level rotating priority scheme between the EISA bus masters is shown. The EISA master request signal PRE_MSTREQ is provided by a five-input NAND gate 1002, whose five inputs receive signals MREQ_[4:0]. The signal SELECTED_MREQ_, which is driven high if the previous EISA bus master having ownership of the bus deasserts its request signal MRQ_, is provided by the output of a five-input OR gate 1004. The inputs of the OR gate 1004 are connected to the outputs of two input AND gates 1006, 1008, 1010, 1012 and 1014. The inputs of the AND gate 1006 receive signals MRQ_[4] and PREV_MST[4]; the inputs of the AND gate 1008 receive signals MRQ_[3] and PREV_MST[3]; the inputs of the AND gate 1010 receive signals MRQ_[2] and PREV_MST[2]; the inputs of the AND gate 1012 receive signals MRQ_[1] and PREV_MST[1]; and the inputs of the AND gate 1014 receive signals MRQ_[0] and PREV_MST[0].

The signals PREV_MST[4:0] are provided by the output of a 5-bit latch 1016, whose gate input is connected to the output of an AND gate 1018. The first input of the AND gate 1018 receives the signal CHANGE, and the second input is connected to the output of an OR gate 1020. The inputs of the OR gate 1020 receive the signal N_MST_WINS and the inverted state of the signal RST_. The data input of the latch 1016 receives signals NEXT_MST[4:0], which are provided by a 5-bit D-type flip-flop 1022. The D input of the flip-flop 1022 is connected to the output of a 10:5 multiplexor 1024 and the flip-flop is clocked on the falling edge of the signal BCLK. The 0 input of the multiplexor 1024 receive the signals NEXT_MST[4:0] and the 1 input of the multiplexor 1024 receives the signals MST_WINS[4:0] which indicate the EISA bus masters having the highest priority. The select input of the multiplexor 1024 receives the signal NEXT_CLK. The signals NEXT_MST[4:0] are also provided to the data input of a 5-bit latch 1026, whose output provides signals PRES_MST[4:0]. The gate input of the latch 1026 receives the signal CHANGE. Thus, the state of the signal PREV_MST[4:0] change only when the signal CHANGE is asserted and the signal N_MST_WINS is asserted indicating that the EISA bus masters have won in the first level arbitration cycle. The signals PRES_MST [4:0] are allowed to change state on each assertion of the signal CHANGE. The signals PRES_MST[4:0] indicate the current highest priority EISA bus master and the signals PREV_MST[4:0] indicate the previous EISA bus master which had ownership of the EISA bus E.

As noted, the signals MST_WINS[4:0] indicate which of the EISA bus masters has the highest priority on the EISA bus E in the current second level arbitration cycle. The signal MST_WINS[Y], Y equals 1–4, is provided by a three-input AND gate 1028. Two inputs of the AND gate 1028 receive the signals DMREQ[Y] and EISA_WINS. The other input of the AND gate 1028 is connected to the inverted state of the output of a two-input AND gate 1032, whose inputs receive signals PREV_MST_[Y-1] and OFF[Y-1]. The signal PREV_MST_[Y] is the inverted state of the signal PREV_MST[Y]. Thus, for example, if the AND gate 1028 provides the signal MST_WINS[4], then the inputs of the AND gate 1032 would receive the signals PREV_MST_[3] and OFF[3]. The output of the AND gate 1032 is connected further to one input of a two-input OR gate 1030, whose other input receives the signal DMREQ[Y]. The output of the OR gate 1030 provides the signal OFF[Y].

The signal MST_WINS[0] is provided by the output of a three-input AND gate 1034. Two of the inputs of the AND gate 1034 receive the signals DMREQ[0] and EISA_WINS. The third input is connected to the inverted state of the output of an AND gate 1038, whose inputs receive signals MRQ0_GATE and OFF[4]. The output of the AND gate 1038 is connected to one input of a two-input OR gate 1036, whose other input receives the signal DMREQ[0]. The output of the OR gate 1036 provides the signal OFF[0]. The signal MRQ0_gate is provided by the output of a two-input NOR gate 1040 whose first input receives the signal PREV_MST[4] and whose second input is connected to the output of a set/reset flip-flop 1042. The set input of the flip-flop 1042 receives the inverted state of the signal RST_, and the reset input is connected to the output of an AND gate 1044. The inputs of the AND gate 1044 receive the signals CHANGE and N_MST_WINS. Thus, on reset, the MRQ0_GATE signal will behave as if the previous EISA bus master was bus master 4, thereby allowing bus master 0 to gain the highest priority in the current second level arbitration cycle. Effectively, a second level five-way rotating priority scheme has been provided for the five EISA bus masters. Bus master 0 starts out as having the highest priority, followed by bus masters 1, 2, 3 and 4. Each EISA bus master that has previously won is then given the lowest priority in the next arbitration cycle.

Once an EISA bus master has gained control of the EISA bus E, it can own the bus for as long as it wishes until another active request is received by the central arbitration controller 186. When that occurs, the EISA bus master must relinquish control of the EISA bus E in 64 BCLK periods or approximately 8 microseconds. The fact that another active request has been received is indicated by assertion of a signal KILL_MASTER, which is provided by a two-input AND gate 1046. The first input of the AND gate 1046 is connected to the output of a D-type flip-flop 1048, and its second input receives the inverted state of the signal CHANGE. The flip-flop 1048 is clocked on the rising edge of the signal BCLK, and its D input is connected to the output of an AND gate 1050. The first input of the AND gate 1050 receives the signal DHLDA, and its second input is connected to the output of a four-input OR gate 1052. One input of the OR gate 1052 is connected to the output of the flip-flop 1048 as a latch term, and another input of the OR gate 1052 is connected to the output of a two-input AND gate 1054. The other two inputs of the OR gate 1052 receive the PCI request signal PCIREQ and the refresh request signal REFREQ. The first input of the AND gate 1054 receives the inverted state of the signal PASS_UP and a second input is connected to the output of an OR gate 1056. The inputs of the OR gate 1056 receive the DMA request signal SYNC_DRQ and the EISA bus master request signal PRE_MSTREQ.

The signal KILL_MASTER is provided to an inverted input of a three-input NAND gate 1058. The other inputs of the NAND gate 1058 receive the signals DHLDA and PRES_MST[Y]. The output of the NAND gate 1058 provides the bus master acknowledge signal MAK_[Y], Y equals 0–4. The signals MAK_[4:0] are slot specific acknowledge signals used to indicate to the EISA bus masters that they have ownership of the EISA bus E. When the signal MAK_[Y] is deasserted in response to the assertion of the signal KILL_MASTER, the corresponding EISA bus master responds by deactivating its MRQ_[Y] signal within 64 BCLK periods. If the EISA bus master does not relinquish control of the EISA bus E within 64 BCLK periods, a timeout condition occurs and an NMI is asserted to the CPU 100.

Thus, a computer system has been described having a plurality of arbiters for arbitrating requests from bus masters on a PCI bus and an EISA bus. Each of the PCI and EISA buses have a plurality of masters. The PCI bus utilizes a modified LRU arbitration scheme, while the EISA bus utilizes a rotating priority scheme. The arbiter on the EISA bus includes a first level of arbitration and a second level of arbitration. The first level is assigned a plurality of requestor types to determine the priority between the requester types. Certain of the first level requestor types include a plurality of devices. If one of those certain requestor types wins priority on the first level arbitration cycle, a second level arbitration is performed to determine the priority between the plurality of devices.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An arbitration circuit in a computer system having a first bus and a second bus, a plurality of first bus masters connected to the first bus, and a plurality of second bus masters connected to the second bus, the plurality of first bus masters providing a corresponding number of first bus request signals for the first bus, the plurality of second bus masters providing a corresponding number of second bus request signals for the second bus, the arbitration circuit comprising:

a first arbiter for connection to the first bus, said first arbiter responsive to the plurality of first bus request signals for providing a first-to-second signal indicating a request from a first bus master for the second bus, said first arbiter including:

a first prioritizer responsive to the plurality of first bus request signals and a second-to-first request signal for determining the highest priority bus master on the first bus; and a first granting circuit coupled to said first prioritizer for granting ownership of the first bus to the highest priority bus master; and a second arbiter for connection to the second bus, said second arbiter responsive to the plurality of second bus request signals for providing the second-to-first request signal indicating a request from a second bus master for the first bus, said second arbiter including:

a first level arbiter responsive to the first-to-second request signal and the plurality of second bus request signals for performing a first level arbitration to determine priority between a plurality of requester types, said plurality of requestor types including a first requestor type comprising the first bus masters represented by said first-to-second request signal, the other plurality of requestor types each containing a different portion of the plurality of second bus masters;

a second level arbiter coupled to said first level arbiter for performing a second level arbitration if one of certain of said requestor types is determined to have the highest priority, said second level arbiter for determining which of the plurality of second bus masters in said highest priority requester type has the highest priority; and a second granting circuit coupled to said first level arbiter and said second level arbiter for granting ownership of the second bus to the highest priority bus master.

2. The arbitration circuit of claim 1, wherein said first level arbiter determines priority between said plurality of requester types only when said first granting circuit grants ownership of the first bus to a second bus master.

3. The arbitration circuit of claim 1, wherein said first level arbiter utilizes a rotating priority scheme to determine the requestor type having highest priority.

4. The arbitration circuit of claim 3, wherein said first prioritizer utilizes a least recently used priority scheme.

5. The arbitration circuit of claim 3, wherein said plurality of second bus masters include a plurality of second bus expansion bus masters and a direct memory access (DMA) controller having a plurality of channels, said plurality of requestor types further including a second requestor type comprising said plurality of channels of said DMA controller and a third requestor type comprising said second bus expansion bus masters.

6. The arbitration circuit of claim 5, wherein the computer system further includes a microprocessor coupled to the first bus capable of receiving an interrupt, wherein second bus request signals corresponding to said second requestor type and said third requestor type are masked if said interrupt is asserted while said first-to-second request signal is asserted.

7. The arbitration circuit of claim 6, wherein said interrupt is a non-maskable interrupt.

8. The arbitration circuit of claim 5, wherein said plurality of second bus masters further include a refresh controller, and wherein said first requester type further includes said refresh controller.

9. The arbitration circuit of claim 8, wherein said first level arbiter determines priority between said plurality of requestor types only when said first granting circuit grants ownership of the first bus to one of said plurality of second bus expansion bus masters or said DMA controller.

10. The arbitration circuit of claim 8, wherein said rotating priority scheme includes a plurality of priority slots being assigned to said first, second and third requestor types, said first requestor type being assigned two of said plurality of priority slots.

11. The arbitration circuit of claim 5, wherein said rotating priority scheme includes a plurality of priority slots being assigned to said first, second and third requester types, said first requestor type being assigned two of said plurality of priority slots.

12. The arbitration circuit of claim 11, wherein said second requester type is assigned a different two of said plurality of priority slots.

13. The arbitration circuit of claim 12, wherein said plurality of priority slots include a first slot assigned to said first requestor type, a second slot assigned to said second requester type, a third slot assigned to said first requester type, a fourth slot assigned to said third requester type, and a fifth slot assigned to said second requestor type.

14. The arbitration circuit of claim 5, wherein if said third requestor type is determined by said first level arbiter as having the highest priority, said second level arbiter utilizes a rotating priority scheme to determine the expansion I/O device having the highest priority.

15. The arbitration circuit of claim 5, wherein said second level arbiter performs the second level arbitration if either of said second or third requestor types is determined in the first level arbitration to have the highest priority.

16. The arbitration circuit of claim 15, wherein the first bus is a peripheral component interconnect (PCI) bus and the second bus is an extended industry standard architecture (EISA) bus.

17. A computer system, comprising:
   a first bus;
   a second bus;
   a plurality of first bus masters connected to said first bus, wherein said plurality of first bus masters provide a corresponding number of first bus request signals for said first bus;
   a plurality of second bus masters connected to said second bus, wherein said plurality of second bus masters provide a corresponding number of second bus request signals for said second bus;
   a first arbiter coupled to said first bus, said first arbiter responsive to said plurality of first bus request signals for providing a first-to-second request signal indicating a request from a first bus master for said second bus, said first arbiter including:
      a first prioritizer responsive to said plurality of first bus request signals and a second-to-first request signal for determining the highest priority bus master on said first bus; and
      a first granting circuit coupled to said first prioritizer for granting ownership of said first bus to the highest priority bus master; and
   a second arbiter coupled to said second bus, said second arbiter responsive to said plurality of second bus request signals for providing the second-to-first request signal indicating a request from a second bus master for said first bus, said second arbiter including:
      a first level arbiter responsive to said first-to-second request signal and said plurality of second bus request signals for performing a first level arbitration to determine priority between a plurality of requestor types, said plurality of requester types including a first requester type comprising said first bus masters represented by said first-to-second request signal, said other plurality of requester types each containing a different portion of said plurality of second bus masters;
      a second level arbiter coupled to said first level arbiter for performing a second level arbitration if one of certain of said requestor types is determined to have the highest priority, said second level arbiter for determining which of said plurality of second bus masters in said highest priority requestor type has the highest priority; and
      a second granting circuit coupled to said first level arbiter and said second level arbiter for granting ownership of said second bus to the highest priority bus master.

18. The computer system of claim 17, wherein said first level arbiter determines priority between said plurality of requestor types only when said first granting circuit grants ownership of said first bus to a second bus master.

19. The computer system of claim 17, wherein said first level arbiter utilizes a rotating priority scheme to determine the requester type having highest priority.

20. The computer system of claim 19, wherein said first prioritizer utilizes a least recently used priority scheme.

21. The computer system of claim 19, wherein said plurality of second bus masters include a plurality of second bus expansion bus masters and a direct memory access (DMA) controller having a plurality of channels, said plurality of requestor types further including a second requester type comprising said plurality of channels of said DMA controller and a third requestor type comprising said second bus expansion bus masters.

22. The computer system of claim 21, wherein the computer system further includes a microprocessor coupled to the first bus capable of receiving an interrupt, wherein second bus request signals corresponding to said second requestor type and said third requestor type are masked if said interrupt is asserted while said first-to-second request signal is asserted.

23. The computer system of claim 22, wherein said interrupt is a non-maskable interrupt.

24. The computer system of claim 21, wherein said plurality of second bus masters further include a refresh controller, and wherein said first requestor type further includes said refresh controller.

25. The computer system of claim 24, wherein said first level arbiter determines priority between said plurality of requester types only when said first granting circuit grants ownership of said first bus to one of said plurality of second bus expansion bus masters or said DMA controller.

26. The computer system of claim 24, wherein said rotating priority scheme includes a plurality of priority slots being assigned to said first, second and third requester types, said first requester type being assigned two of said plurality of priority slots.

27. The computer system of claim 21, wherein said rotating priority scheme includes a plurality of priority slots being assigned to said first, second and third requester types, said first requester type being assigned two of said plurality of priority slots.

28. The computer system of claim 27, wherein said second requestor type is assigned a different two of said plurality of priority slots.

29. The computer system of claim 28, wherein said plurality of priority slots include a first slot assigned to said first requester type, a second slot assigned to said second requester type, a third slot assigned to said first requester type, a fourth slot assigned to said third requestor type, and a fifth slot assigned to said second requester type.

30. The computer system of claim 21, wherein if said third requester type is determined by said first level arbiter as having the highest priority, said second level arbiter utilizes a rotating priority scheme to determine the expansion I/O device having the highest priority.

31. The computer system of claim 21, wherein said second level arbiter performs the second level arbitration if either of said second or third requester types is determined in the first level arbitration to have the highest priority.

32. The computer system of claim 21, wherein said first bus is a peripheral component interconnect (PCI) bus and said second bus is an extended industry standard architecture (EISA) bus.

* * * * *